US005287449A

United States Patent [19]

[11] Patent Number: 5,287,449

[45] Date of Patent: Feb. 15, 1994

Kojima

[54] AUTOMATIC PROGRAM GENERATION METHOD WITH A VISUAL DATA STRUCTURE DISPLAY

[75] Inventor: Keiji Kojima, Tokyo, Japan

[73] Assignee: Hitachi, Ltd., Tokyo, Japan

[21] Appl. No.: 595,747

[22] Filed: Oct. 9, 1990

Related U.S. Application Data

[63] Continuation of Ser. No. 266,079, Nov. 2, 1988, abandoned.

[30] Foreign Application Priority Data

Nov. 6, 1987 [JP] Japan ................................ 62-279215

[51] Int. Cl.$^5$ ................................ G06F 3/14

[52] U.S. Cl. ................................ 395/161; 395/159

[58] Field of Search ............ 364/280.7, 286.1, 927.63, 364/521, 147, 148; 340/721; 395/133, 155, 159, 161

[56] References Cited

U.S. PATENT DOCUMENTS

| | | | |
|---|---|---|---|
| 4,449,180 | 5/1984 | Ohshima et al. | 364/147 |
| 4,455,619 | 6/1984 | Masui et al. | 364/900 |
| 4,653,020 | 3/1987 | Cheselka et al. | 364/900 |
| 4,672,554 | 6/1987 | Ogaki | 364/479 |
| 4,692,858 | 9/1987 | Redford et al. | 364/200 |
| 4,730,315 | 3/1988 | Saito et al. | 364/200 X |
| 4,791,561 | 12/1988 | Huber | 364/300 |
| 4,813,013 | 3/1989 | Dunn | 364/900 |
| 4,831,580 | 5/1989 | Yamada | 395/133 |

FOREIGN PATENT DOCUMENTS 58-03039 8/1983 Japan .

OTHER PUBLICATIONS

Rubin, Robert V. et al, Think Pad: A Graphical System for Programming by Demonstration, Mar. 1985 pp. 73–78.

International Symposium on New Directions in Computing, Aug. 1985, pp. 335–343.

Habereder et al, "An Automatic Signal Processing Software Source Code Generation and Execution System" May 1986, pp. 671–681.

Chang et al, "A Visual Language Compiler", Oct. 1987, pp. 300–307.

Yoshimoto et al, "Interactive Iconic Programming Facility in Hi-Visual" IEEE Workshop on Visual Languages 1986, pp. 34–41.

Finzer et al. "Programming by Rehearsal" *Byte,* Jun. 1984, pp. 187–210.

Chang "Visual Languages: A Tutorial and Survey" IEEE Software, vol. 4 No. 1, Jan. 1987, pp. 29–39.

Myers "The State of the Art in Visual Programming and Program Visualization" Technical Report CMU-CS-88-114, Carnegie Mellon University, Feb. 1988.

*Primary Examiner*—Heather R. Herndon

*Attorney, Agent, or Firm*—Antonelli, Terry, Stout & Kraus

[57] ABSTRACT

A method for displaying on an image plane of a display unit a first area as an area representative of array data and displaying in place of the first area the, in response to a first input from an input device which assigns a position on the image plane of the first area and a first process applied to some elements of the array data, as an area representative of the array data, a second area having at least two partial areas including the partial areas include a first partial area representative of a group of elements subjected to the first process and a second partial area representative of a group of elements not subjected to the first process a program is generated, in response to a position in the image plane of at least one partial area in the second area and a third input instructing the program generation input from the input device after the second input from the input device assigning the second process applied to a group of elements corresponding to the at least one partial area. The program applies the second process to a group of elements corresponding to the at least one partial area after the first process has been executed with respect to some elements of the array data.

12 Claims, 21 Drawing Sheets

| | | | | | | | | | | | |
|---|---|---|---|---|---|---|---|---|---|---|---|
| 0 | 1 | DEF | PART | | | | | | | | 715 |
| 1 | 1 | INT | M | AREA 0 | TRUE | P | UDF | | | | 716 |
| 2 | 1 | ARRAY | A | AREA 1 | TRUE | P | UDF | 1 | N | | 717 |
| 3 | 1 | ARRAY | | AREA 2 | TRUE | | 2 | 1 | I0-1 | | 807 |
| 4 | 1 | ARRAY | X | AREA 3 | X≥M | | 2 | I0 | I0 | L | 808 |
| 5 | 1 | ARRAY | | AREA 4 | TRUE | | 2 | I0+1 | N | | 809 |

| | | | | | | | | | | | |
|---|---|---|---|---|---|---|---|---|---|---|---|
| 0 | 1 | DEF | PART | | | | | | | | 715 |
| 1 | 1 | INT | M | AREA 0 | TRUE | P | UDF | | | | 716 |
| 2 | 1 | ARRAY | A | AREA 1 | TRUE | P | UDF | 1 | N | | 717 |
| 3 | 1 | ARRAY | | AREA 2 | TRUE | | 2 | 1 | I0-1 | | 807 |
| 4 | 1 | ARRAY | X | AREA 3 | X≥M | | 2 | I0 | I0 | L | 808 |
| 5 | 1 | ARRAY | | AREA 4 | TRUE | | 2 | I0+1 | N | | 809 |
| 6 | 1 | ARRAY | | AREA 5 | TRUE | | 5 | I0+1 | I1-1 | | 907 |
| 7 | 1 | ARRAY | Y | AREA 6 | Y<M | | 5 | I1 | I1 | R | 908 |
| 8 | 1 | ARRAY | | AREA 7 | TRUE | | 5 | I1+1 | N | | 909 |

| | | | | | | | | | | |
|---|---|---|---|---|---|---|---|---|---|---|
| 0 | 1 | DEF | PART | | | | | | | 715 |
| 1 | 1 | INT | M | AREA 0 | TRUE | P | UDF | | | 716 |
| 2 | 1 | ARRAY | A | AREA 1 | TRUE | P | UDF | 1 | N | 717 |
| 3 | 1 | ARRAY | | AREA 2 | TRUE | | 2 | 1 | I0-1 | 807 |
| 4 | 1 | ARRAY | X | AREA 3 | X≧M | | 2 | I0 | I0 | L 808 |
| 5 | 1 | ARRAY | | AREA 4 | TRUE | | 2 | I0+1 | N | 809 |
| 6 | 1 | ARRAY | | AREA 5 | TRUE | | 5 | I0+1 | I1-1 | 907 |
| 7 | 1 | ARRAY | Y | AREA 6 | Y<M | | 5 | I1 | I1 | R 908 |
| 8 | 1 | ARRAY | | AREA 7 | TRUE | | 5 | I1+1 | N | 909 |
| 9 | 1 | OP | SWAP | 4 | 7 | | | | | 1006 |

| | | | | | | | | | | | |
|---|---|---|---|---|---|---|---|---|---|---|---|
| 0 | 1 | DEF | PART | | | | | | | | 715 |
| 1 | 1 | INT | M | AREA 0 | TRUE | P | UDF | | | | 716 |
| 2 | 1 | ARRAY | A | AREA 1 | TRUE | P | UDF | 1 | N | | 717 |
| 3 | 1 | ARRAY | | AREA 2 | TRUE | | 2 | 1 | I0-1 | | 807 |
| 4 | 1 | ARRAY | X | AREA 3 | X≥M | | 2 | I0 | I0 | L | 808 |
| 5 | 1 | ARRAY | | AREA 4 | TRUE | | 2 | I0+1 | N | | 809 |
| 6 | 1 | ARRAY | | AREA 5 | TRUE | | 5 | I0+1 | I1-1 | | 907 |
| 7 | 1 | ARRAY | Y | AREA 6 | Y<M | | 5 | I1 | I1 | R | 908 |
| 8 | 1 | ARRAY | | AREA 7 | TRUE | | 5 | I1+1 | N | | 909 |
| 9 | 1 | OP | SWAP | 4 | 7 | | | | | | 1006 |
| 10 | 2 | OP | PART | 1 | 6 | | | | | | 1109 |

*FIG. 12*

```
     PROCEDURE PART (VAR A (1 . . N) : ARRAY OF INTEGER , M : INTEGER ) ; —1201
     VAR I0 , I1 : INTEGER ; W : INTEGER ; E : BOOLEAN ; —1202
     BEGIN —1203
     E : = TRUE ; —1204
     FOR I0 : = 1 TO N DO —1205
     IF A (I0) > = M THEN BEGIN E : = FALSE ; GOTO 1 ; END ; —1206
1215 IF E THEN GOTO 9999 ; —1207
     1 : E : = TRUE ; —1208
     FOR I1 ; = N DOWN TO I0 + 1 DO —1209
     IF A (I1)  M THEN BEGIN E : = FALSE ; GOTO 2 ; END ; —1210
1216 IF E THEN GOTO 9999 ; —1211
     2 : W : = A (I0) ; A (I0) : = A(I1); A(I1): = W ; —1212
     PART (M , A (I0 + 1 . . I1-1)) ; —1213
     9999 : END. —1214
```

AUTOMATIC PROGRAM GENERATION METHOD WITH A VISUAL DATA STRUCTURE DISPLAY

This application is a continuation of application Ser. No. 266,079, filed on Nov. 2, 1988, now abandoned.

BACKGROUND OF THE INVENTION

The present invention relates to program preparation methods, and particularly to a program preparation method suitable for preparation of processing programs having complicated data structures.

In the past, as a method for visualizing a program to enhance the efficiency of preparation, a method using a program diagram represented by a flow chart has been used. There is also known an apparatus in which a two-dimensional chart is directly input on CRT to enhance the efficiency, as in the apparatus disclosed in Japanese Patent Laid-Open No. 3039/1983.

The above-described prior art enables the two-dimensional visualization and display of controls such as selection, repetition and the like in programs. In the prior art, no consideration has been given to the visualization of data themselves. There gives rise to a problem in that in a program which principally deals with the operation of the data construction, the contents processed are not defined. This problem will be described briefly with reference to the drawings.

FIG. 14 is a flow chart of a divisional processing which constitutes a center portion of a quick sort program for sorting a plurality of data. The divisional processing herein termed means that elements of array data A are rearranged, so that a first group of elements (for example, n) of values smaller than a divisioned central value suitably assigned will be elements A(1),A(2), . . . A(n) which are small in number while a second group of elements (for example, N-n) of values larger than M will be elements A(n+1), . . . A(N) which are large in number. In the divisional processing, judgement is first made, starting A(1) out of elements A(1)-A(N) in array A, whether the respective elements are larger than M (Steps 900-904); when an element (for example, A(k)) smaller than M is first detected, judgement is made, starting A(N), whether the respective elements are smaller than M (Steps 905-907); and when an element (for example, A(l)) larger than M is first detected, the element A(k) is replaced by A(l) (Steps 908-910). Thereafter, the same processing is repeated (Steps 902-910). As will be apparent from FIG. 14, in the flow chart, the program control construction such as the judgement of conditions, a repetition (for example, Steps 904 and 907), are illustrated and defined, however, the data construction such as the positional relationship of the elements in the array is not visualized, which is not sufficient to intuitively understand the processing contents.

SUMMARY OF THE INVENTION

It is an object of the present invention to provide a method for preparing programs comprising visualizing a data construction to prepare a program while easily displaying processing contents.

Accordingly, the present invention provides a method which comprises displaying on an image plane of a display unit a first area as an area representative of array data; displaying on the image plane of the display unit, in response to a first input from an input device which assigns a position on the image plane of the first area and a first process applied to some elements of the array data, as an area representative of the array data, a second area having at least two partial areas consisting of a first partial area representative of a group of elements subjected to the first process and a second partial area representative of a group of elements not subjected to the first process, in place of the first area, and generating, in response to a position in the image plane of at least one partial area in the second area and a third input instructing the program generation input from the input device after the second input from the input device assigning the second process applied to a group of elements corresponding to the at least one partial area, a program applying the second process to a group of elements corresponding to said at least one partial area after said first process has been executed with respect to some elements of the array data.

BRIEF DESCRIPTION OF THE DRAWINGS

FIG. 8B illustrates the display image together with the previous operations when the second input step is completed in the apparatus shown in FIG. 1;

FIG. 9B illustrates the template in a visual operation stack (303) when the third input step is completed in the apparatus shown in FIG. 1;

FIG. 10B illustrates the display image together with the previous operations when the fourth input step is completed in the apparatus shown in FIG. 1;

FIG. 11B illustrates the template in a visual operation stack (303) when the fifth input step is completed in the apparatus show in FIG. 1;

FIG. 12 illustrates one example of an object program (104) generated in the apparatus of FIG. 1.

DESCRIPTION OF THE EMBODIMENTS

In the following, one embodiment of the present invention will be described with reference to the drawings.

Figure 1:
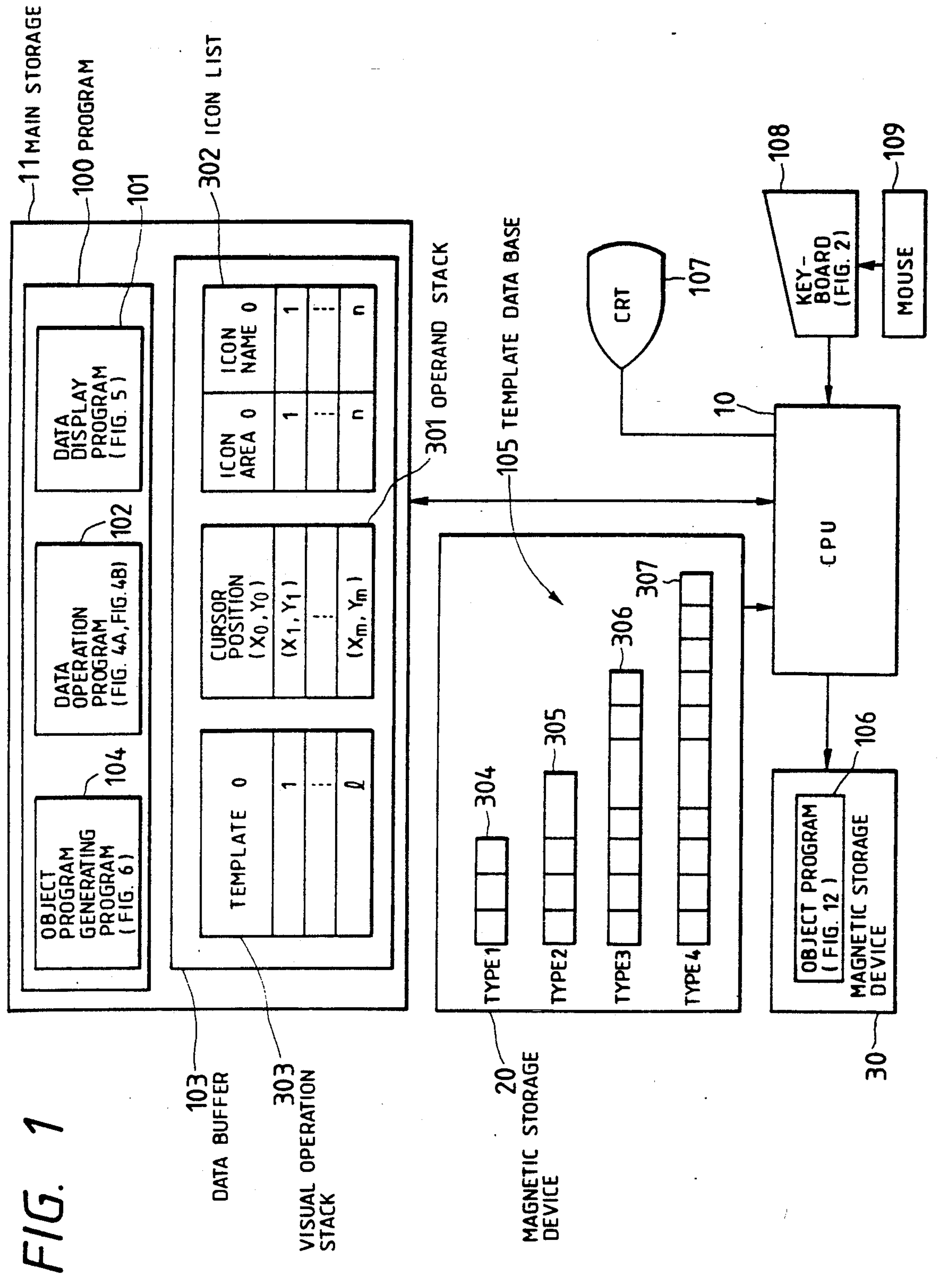
FIG. 1 is a schematic block diagram of a program generation apparatus according to the present invention.

FIG. 1 shows a schematic structure of a program preparation apparatus according to the present invention.

Figure 3:
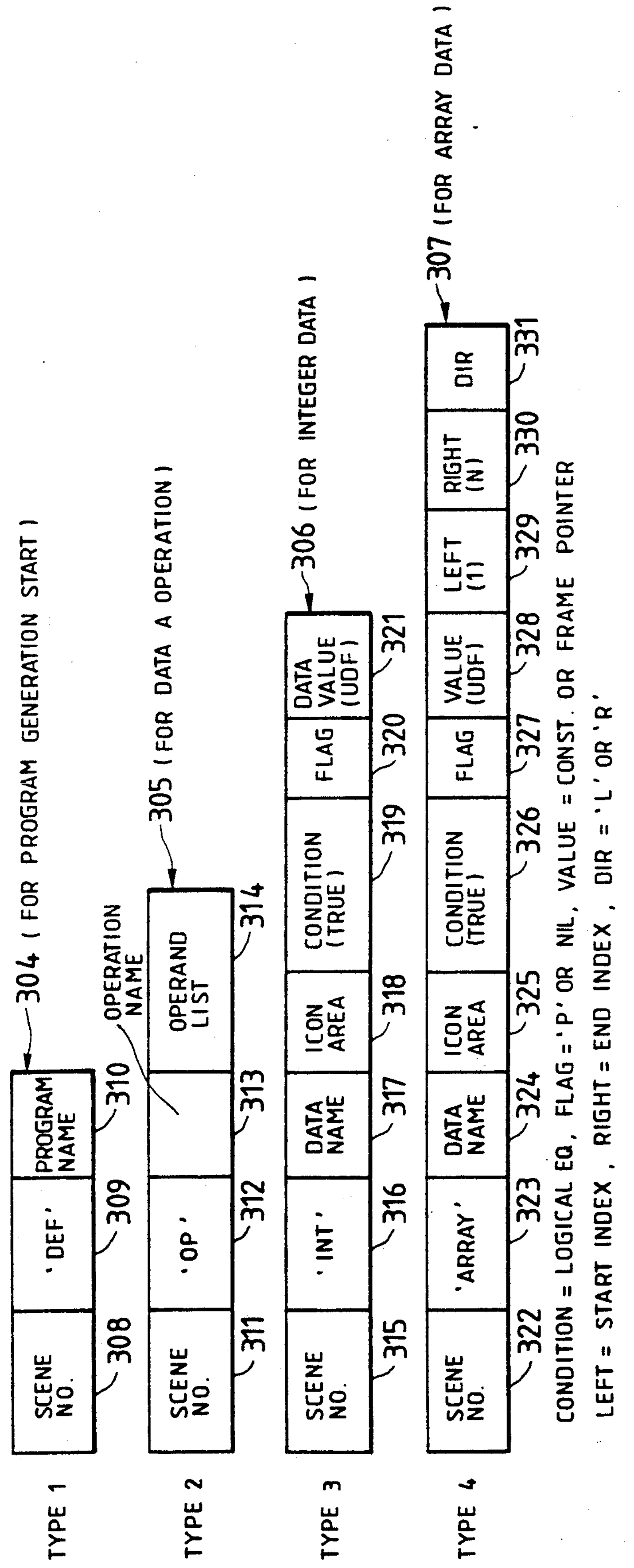
FIG. 3 illustrates a data construction of various templates within a template data base (105) used in the apparatus shown in FIG. 1.

In the Figure, reference numeral 10 designates a central processing unit (CPU); 11, a main memory; 20, a magnetic memory for retaining a template data base 105 comprising a plurality of template records 304–307; 30, a magnetic memory for retaining an object program 106 generated; 107, a CRT display device; 108, a keyboard; and 109, a mouse. The template records 304–307 herein termed refer to data comprising a plurality of fields for retaining data of predetermined items as illustrated in FIG. 3. Reference numeral 100 designates a program for generating programs according to the present invention comprising a data operation program 102, a data display program 101 and an object program generating program 104. Reference numeral 103 designates an area for a data buffer used in executing the above functions, into which are later stored an operand stack 301, icon list 302 and a visual operation stack 303.

The outline of the operation of this apparatus will be described hereinafter. Every time operation instructions by a programmer are input from the keyboard 108 and the mouse 109, the data operation program 102 removes one template corresponding to the operation instruction input from the template data base 105 to store the template into the visual operation stack 303. At that time, data according to the operation is set to a suitable field within the template. In this manner, a group of templates 1000 with data reflective to one instruction of the programmer written therein are sequentially stored into the stack 303. Every time one template is stored into the stack 303, the data display program 101 displays figures and a row of symbols corresponding to the template on the CRT display 107. When the programmer instructs an input completion from the keyboard 108, the data operation program 102 causes the object program generating program 104 to start. The object program generating program 104 refers to a group of templates in the visual operation stack 303 to generate the corresponding object program 106 to store it into the magnetic memory 30.

The icon list 302 is provided to retain all icon areas and names formed as the result of the operation, and the operand stack is provided to store a position of the icon selected by operation of a cursor.

Figure 7A:
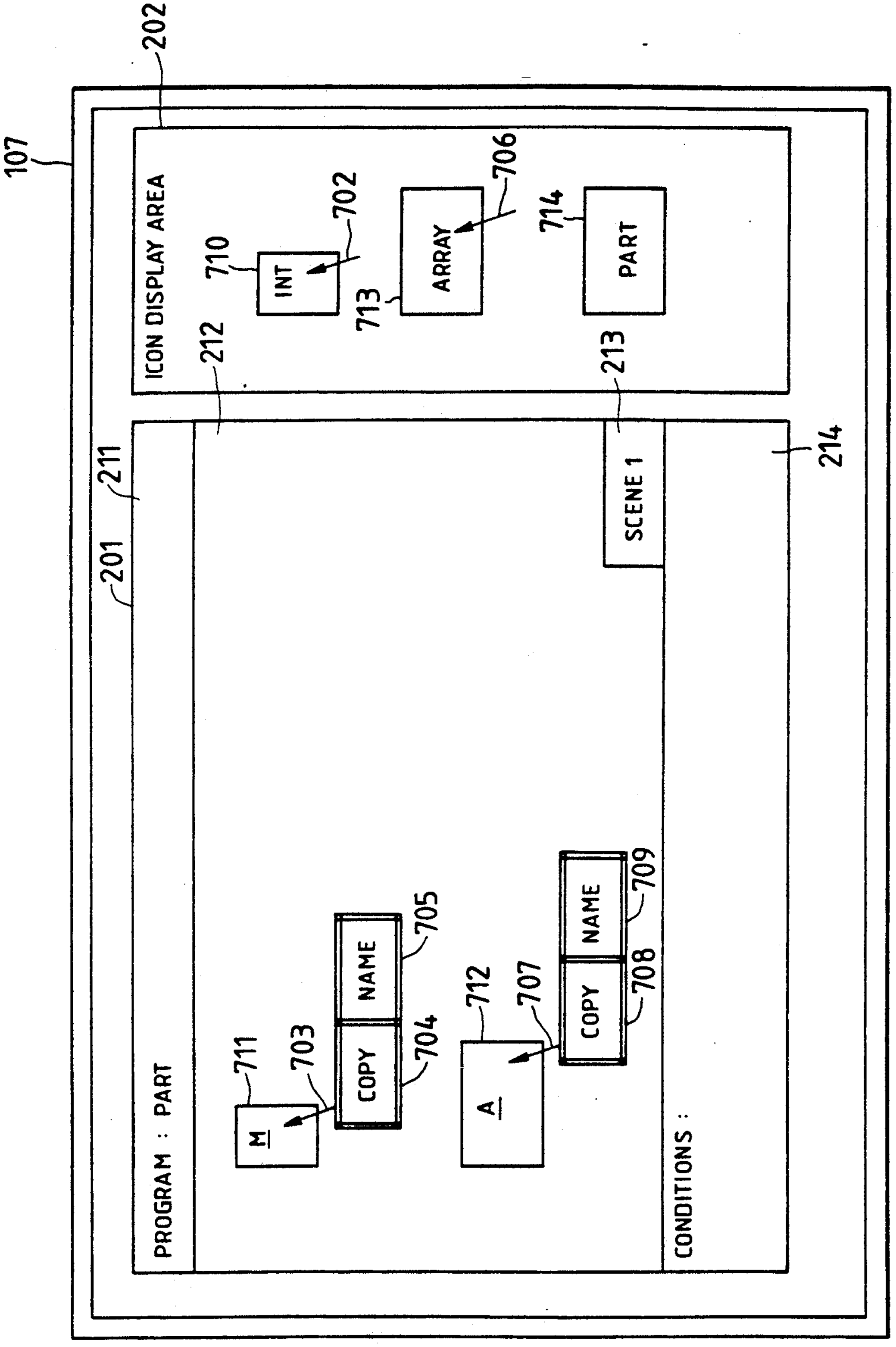
FIG. 7A illustrates the display image together with the previous operations when the first input step is completed in the apparatus shown in FIG. 1.
Figure 14:
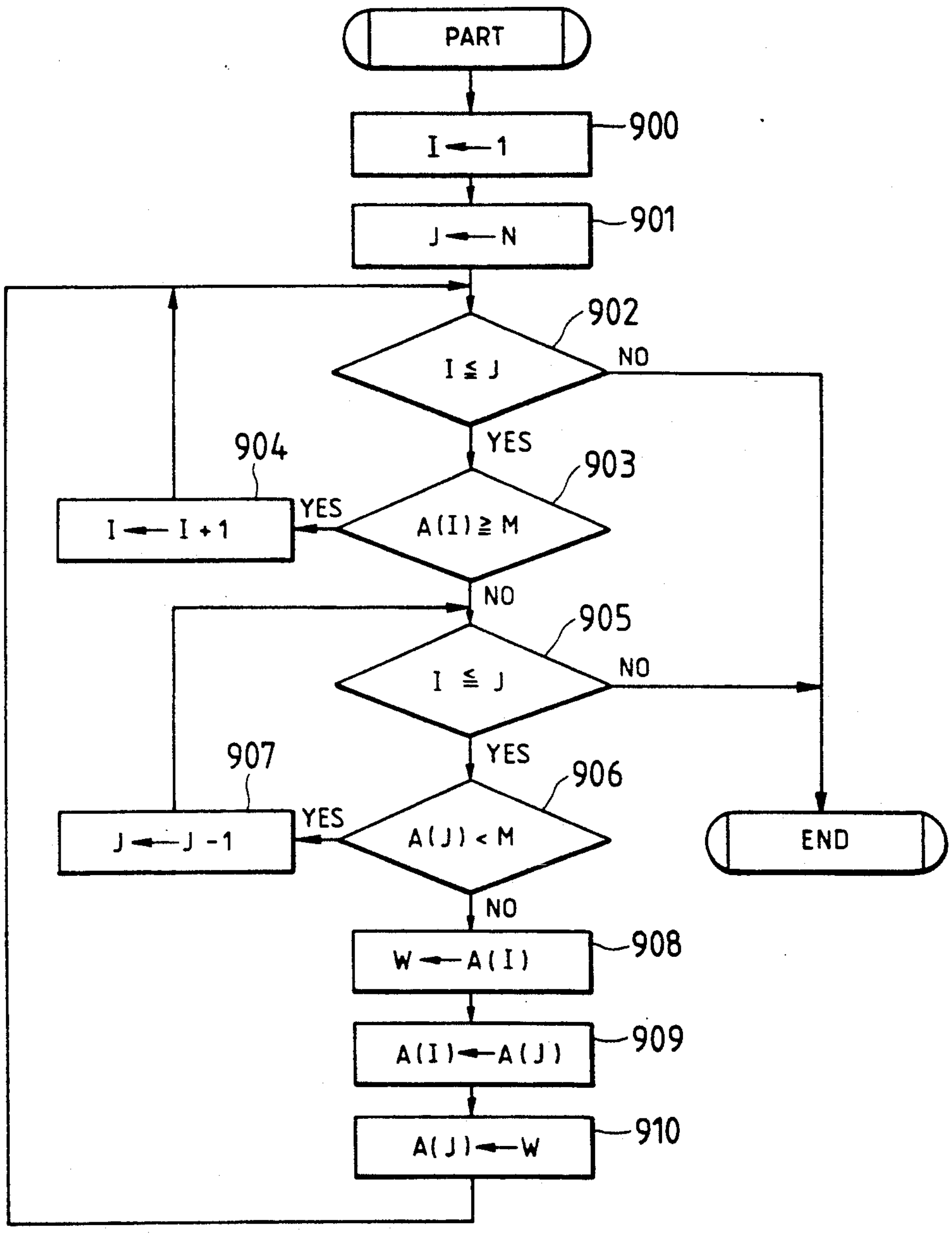
FIG. 14 is a known flow chart of a divisional process program for a quick sort program.

For example, the generation of a program for the divisional process as shown in FIG. 14 is carried out in the following:

A programmer first instructs a removal of the array data A and the integer data D to be processed. In response to this, the data operation program 102 removes templates for the array data and templates for the integer data from the template data base 105 to update fields of names thereof to 'A' and 'M', which are then arranged in that order and stored as a record row into the visual operation stack 303. The data display program 101 refers to the record row to display the array A and the integer M as rectangles 711 and 712 with names on the display 107 (FIG. 7A).

Figure 8A:
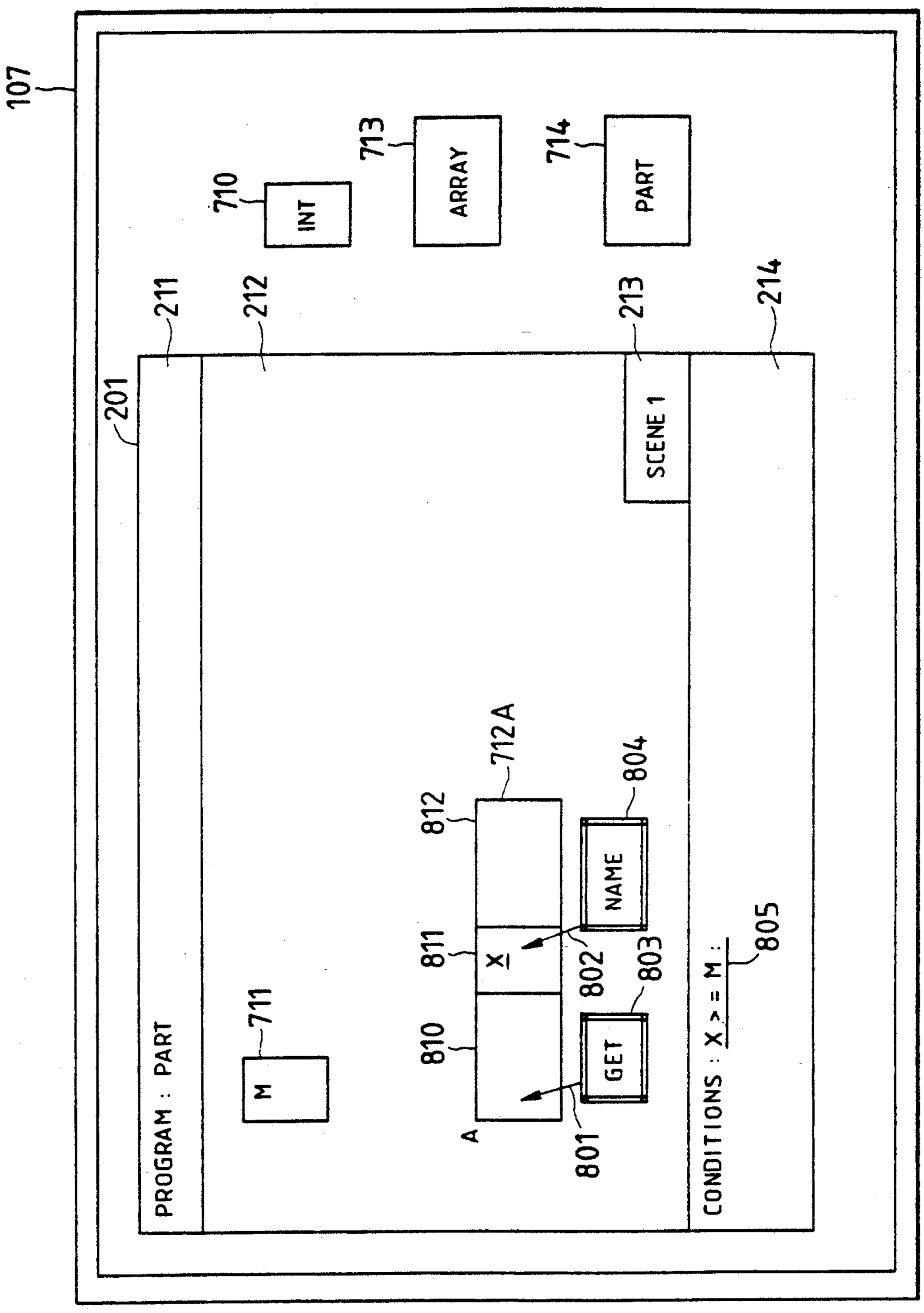
FIG. 8A illustrates the display image together with the previous operations when the second input step is completed in the apparatus shown in FIG. 1.

Subsequently, when the programmer instructs the array data A to search elements larger in value than the M, that is, elements with small number, the data operation program 102 removes three of templates for data from the template data base 105 to add them to the visual operation stack. The second template among three added templates corresponds to the element (hereinafter called X) found during researching, and the fact that is the element larger in value than M and the fact that is the result of research from the left are recorded in the template. The first and third templates among the aforesaid three templates correspond to a portion to the left of the element X (i.e., a group of elements with small number) and a portion to the right (i.e., a group of elements large in number), respectively. The data display program 101 sequentially displays contents of the templates in the visual operation stack, and therefore a rectangle for integer M and a rectangle for array data A divided into three areas 810, 811 and 812 are displayed on the display (FIG. 8A).

Figure 9A:
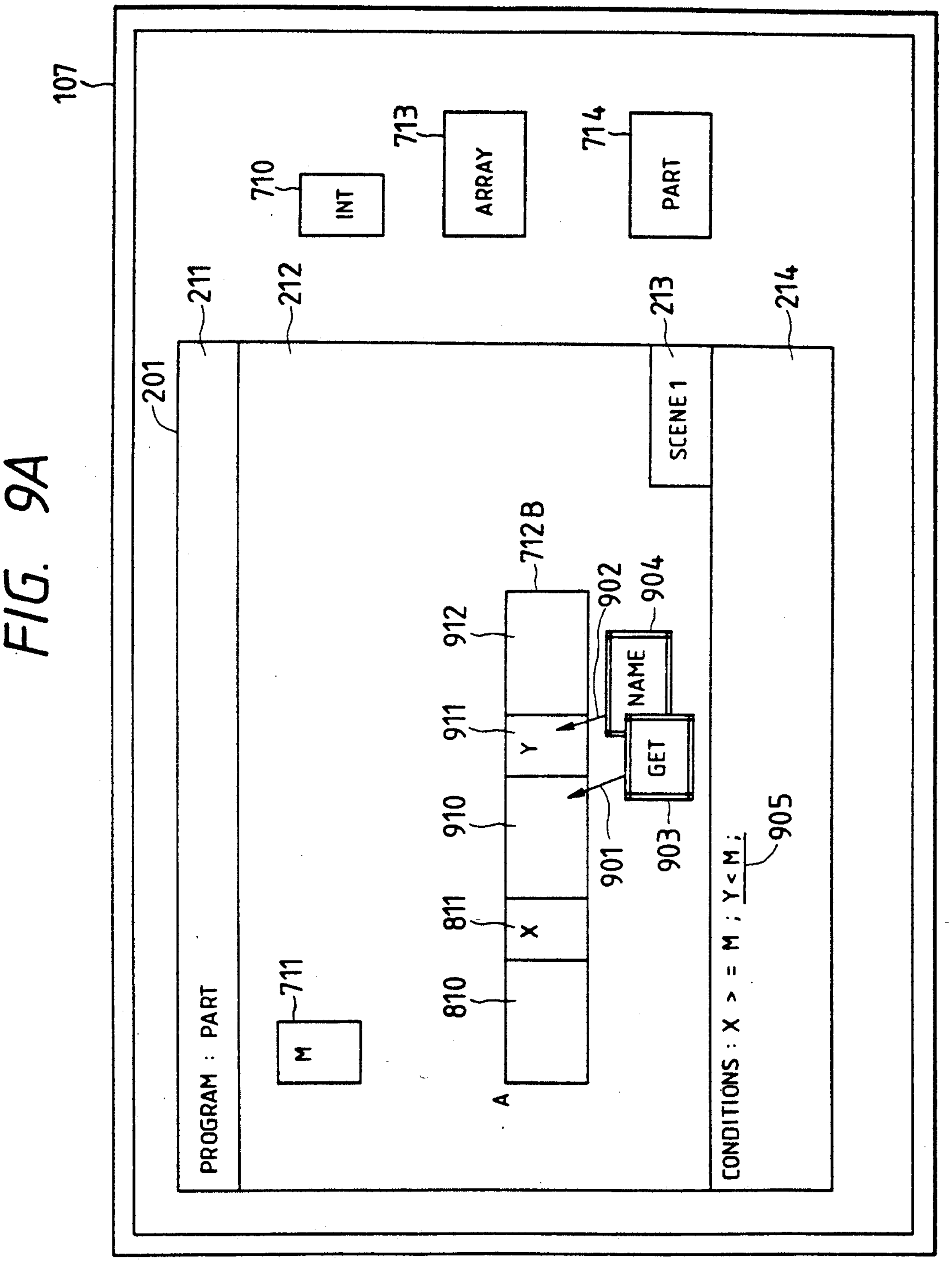
FIG. 9A illustrates the display image together with the previous operations when the third input step is completed in the apparatus shown in FIG. 1.

Next, the programmer assigns the rightmost area 812 among areas for array data A divided into three areas to instruct to search elements smaller than M from the right (an element largest in number), then the data operation program 102 and the display program 101 further divide said area into three areas 910, 911 and 912 and display in a manner similar to the previous step (FIG. 9A). Among these areas, the partial area 911 corresponds to an element (hereinafter called Y) newly found by the research.

Figure 10A:
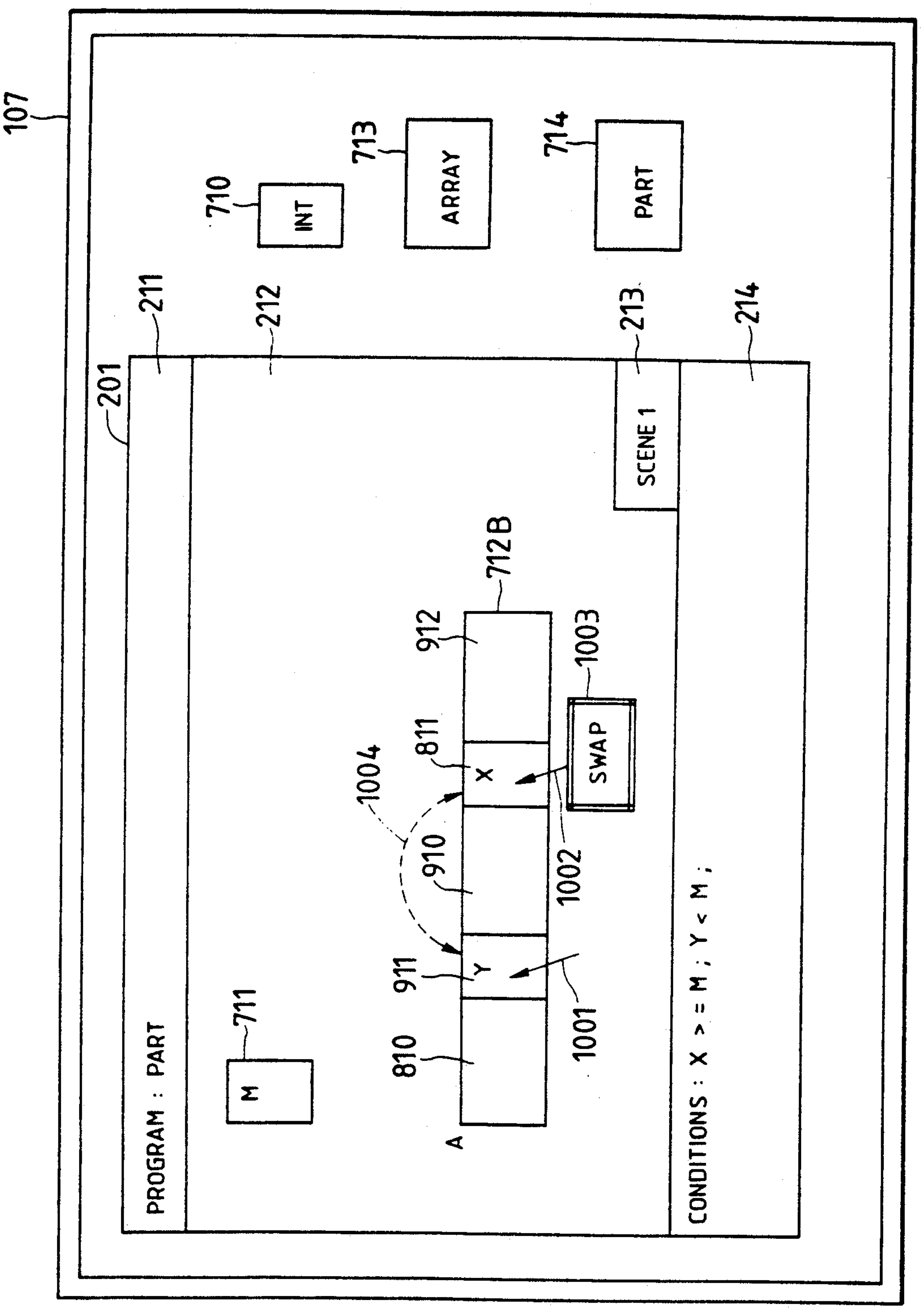
FIG. 10A illustrates the display image together with the previous operations when the fourth input step is completed in the apparatus shown in FIG. 1.

Then, the programmer instructs an exchange of two searched elements X and Y, then the templates corresponding to the operation are removed from the template data base 105, and after codes representative of the exchange have been embedded, they are added to the stack and the exchanged result is displayed (FIG. 10A).

The programmer finally instructs that the above-described operation is reflexively applied to the central area 910. The data operation program 102 removes the template corresponding to the operation from the template data base 105 and adds it to the stack 303 with the fact that is the application of the previous operation written (FIG. 11A), after which the object program generating program 104 generates a divisional processing program in accordance with the template row in the stack. Since an input history such as the required range of elements of array data, the searching direction and conditions, the carried out operations and the like are reserved in order of operations, it is possible to generate a proper object program.

Further, as described above, the data and the results of operation relative thereto are suitably displayed in a figure fashion on the display 107 and the programmer can proceed with the next operation while watching the results thereof, thus making it possible to efficiently prepare programs.

The details of the program preparation apparatus shown in FIG. 1 will be described.

Figure 2:
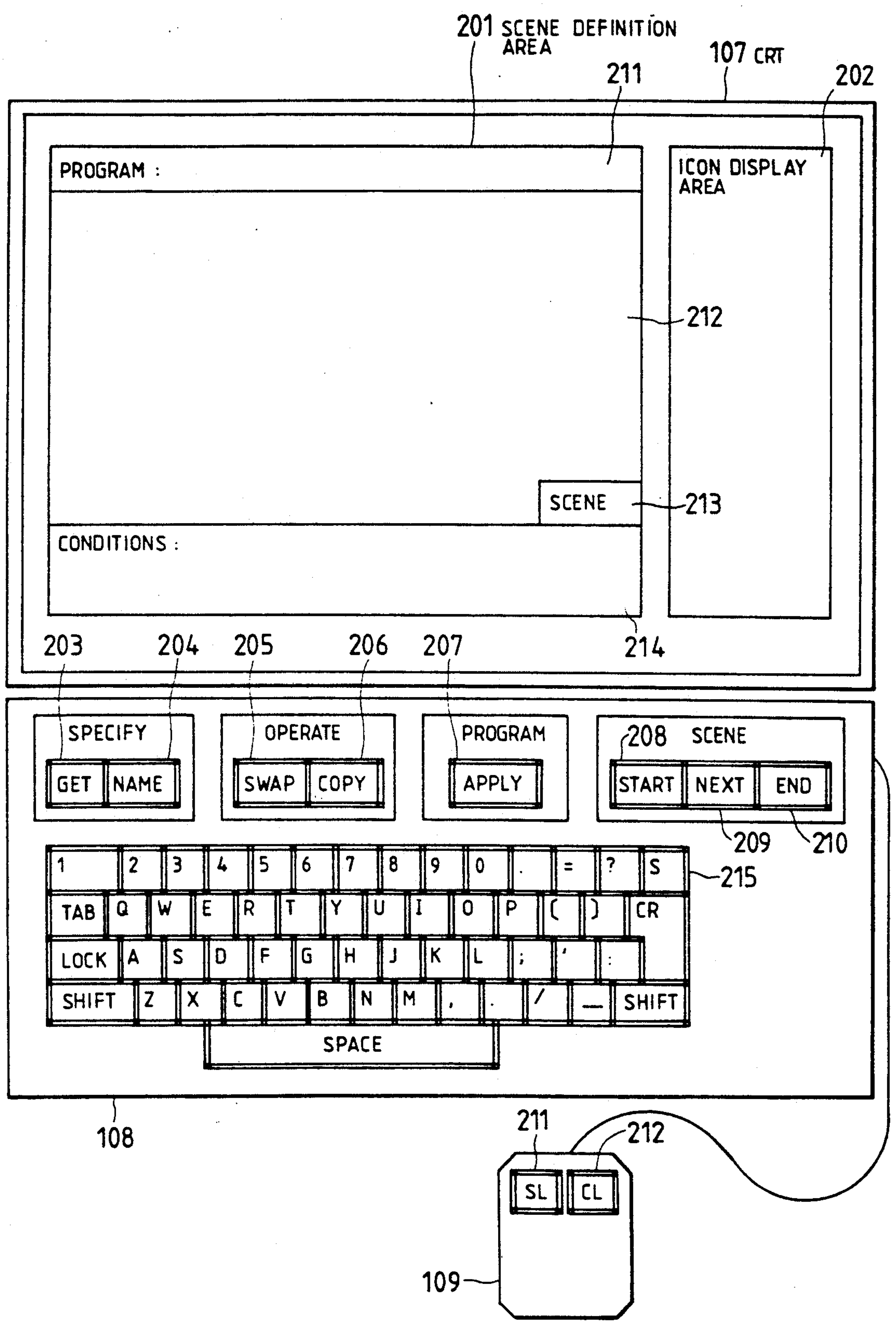
FIG. 2 illustrates a keyboard (108), a key array of a mouse (109) used in the apparatus shown in FIG. 1 and an image plane of CRT display (107)

FIG. 2 shows the details of keys for the image plane of the display 107, the keyboard 108 and the mouth 109.

The image plane of the display 107 comprises an area 201 which defines a scene and an area 202 indicative of icon. The scene defining area 201 further comprises an area 211 for displaying program names in the definition, an area 212 for displaying data and operation, an area 213 for displaying a scene number and an area 214 for displaying the selection conditions, which come to four areas in total. The icon display area 202 is used to display icon corresponding to data and operation used when program is prepared.

On the other hand, the keyboard 108 is normally provided in addition to a group of alphanumeric character keys 215, with function keys 203–210 peculiar to the apparatus of the present embodiment. In the present invention, the keys include "Get" key 203, "Name" key 204, "Swap" key 205, "Copy" key 206, "Apply" key 207, "Start" key 208, "Next" key 209, and "End" key 210.

The mouse 109 has, other than a known cursor moving device (not shown), "SL" key 211 and "CL" key 212.

In FIG. 1, an operand stack 301 is provided to store cursor positions on the image plane, and store coordinates (Xi, Yi) of the cursor position when "SL" key 211 of the mouse 109 is pressed down. That is, the operand stack 301 is a data area for storing positions of displayed figures such as icon.

The icon list 302 is provided to store areas and names of a group of icons displayed within the icon area 202 on the display 107. In the present embodiment, all icons are rectangular for brevity's sake, and the display area is represented by the coordinate at the left upper end of the rectangle, the width and height of the rectangle. In the event the selection key "SL" of the mouse 109 is pressed, in which icon area in the icon list 302 the cursor coordinate at that time is present is checked to thereby judge which icon was selected.

Next, the template data will be described with reference to FIG. 3. Templates are models for data (such as integer data, array data, etc.) and operation (transfer, exchange, etc.). In the present embodiment, templates 304–307 of types 1 to 4 are prepared.

The template 304 of type 1 is used to indicate the start of program preparation and consists of three fields. A scene number later described is later stored into the first field 308. Constant "Def", which template shows that is for instructing a start of program preparation, is stored in advance into the second field 309. A program name to be prepared is a later stored into the third field 310.

The template 305 of type 2 is provided to indicate contents of data operation and comprises four fields. A scene number is later stored into the first field 311. Constant "Op", which template shows that is for data operation, is stored in advance into the second field 312. A name of data operation is later stored into the third field 313, and a list of data operand which is the object for operation is later stored into the fourth field.

The template 306 of type 3 is provided to indicate integer data and comprises seven fields. A scene number is later stored into the first field 315. Constant "Int", which template shows that is for integer data, is stored in advance into the second field 316. A data name, a display area of icon indicative of said data, a logic formula indicative of conditions with which said data is satisfied, and a flag ("P") when said data is an input parameter from outside are later stored into the third field 317, the fourth field 318, the fifth field 319 and the sixth field 320, respectively, and a value of said data is later stored into the seventh field 321.

The template 307 of type 4 is provided to indicate array data and comprises ten fields. An "Array", which template shows that is for array data, is stored in advance into the second field. The first and the third to the seventh fields are the same as the first to seventh fields of the template 306 for integer data. Index values or variables indicative of the smallest element and the largest element to be processed of the array data are later stored into the eighth field 329 and the ninth field 330. Data "L" or "R" indicative of the fact whether the direction when search within the array data is the direction ("L") in which element number increases or the direction ("R") in which element number decreases is stored into the tenth field 331. As will be described later, sometimes, a frame number of a parent template of the visual operation stack 303 instead of the value itself of the array data is stored into the seventh field 328.

Constants determined according to the templates are stored in advance as described above into the second field of each of the templates, and suitable initial values are preset in some other fields as follows:

(1) Fifth field of types 3 and 4: "true"
(2) Seventh field of types 3 and 4: "udf"
(3) Eighth field of type 4: 1
(4) Ninth field of type 4: "N".

The first and third fields of types 1 to 4, the fourth field of types 2 to 4, the sixth field of types 3 and 4 and the tenth field of type 4 are all empty.

When the programmer operates, the template corresponding to the operation is removed from the data base 105, and the value determined by the operation is stored into the fields other than the second field and stored into the visual operation stack 303.

The procedure for preparing a program according to the present invention will be described hereinafter, taking as an example the divisional processing shown in FIG. 14, with reference to a flow chart (FIG. 5) in the form of PAD (program Analysis Diagram) of the data display program, a flow chart (FIG. 4) of the data operation program and a flow chart (FIG. 6) of the object program generating program. FIGS. 7 to 11 show in order the changes of the image plane of the actual display 107 in accordance with the program preparing procedure and the visual operation stack 303 within the data buffer 103. The operation of the programmer shown in FIGS. 7 to 11 and the operation of various parts will be described in detail.

Figure 7B:
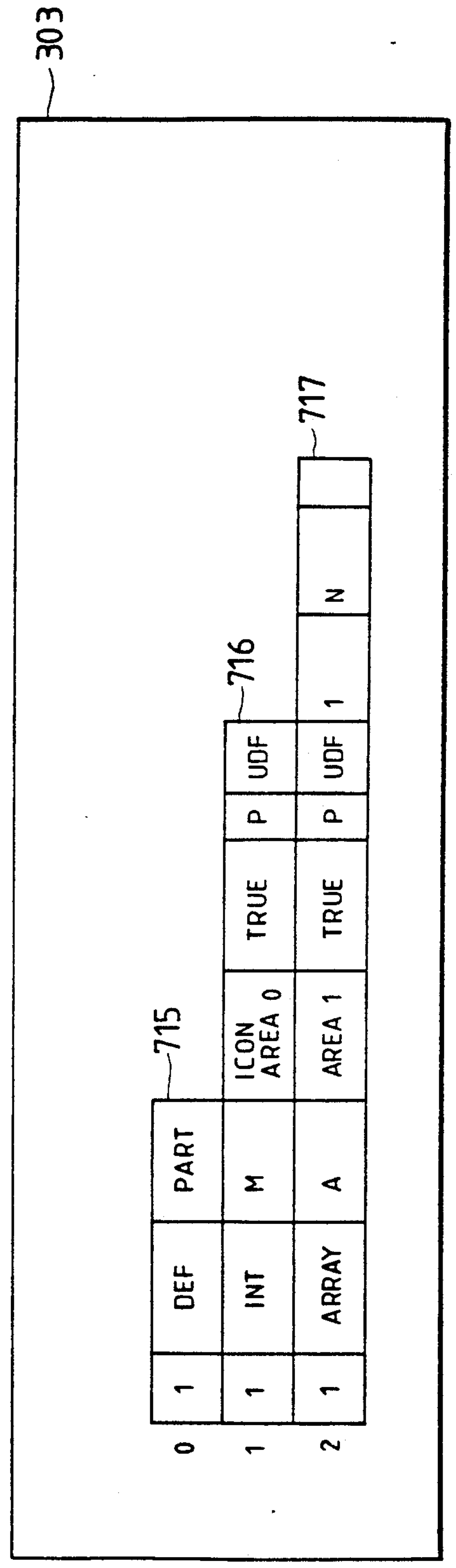
FIG. 7B illustrates the template in a visual operation stack (303) when the first input step is completed in the apparatus shown in FIG. 1.

FIG. 7A shows an image plane 701 of the display 107 after a few operations have already been carried out, and FIG. 7B shows the contents of the visual operation stack 303 at that time.

Figure 4A:
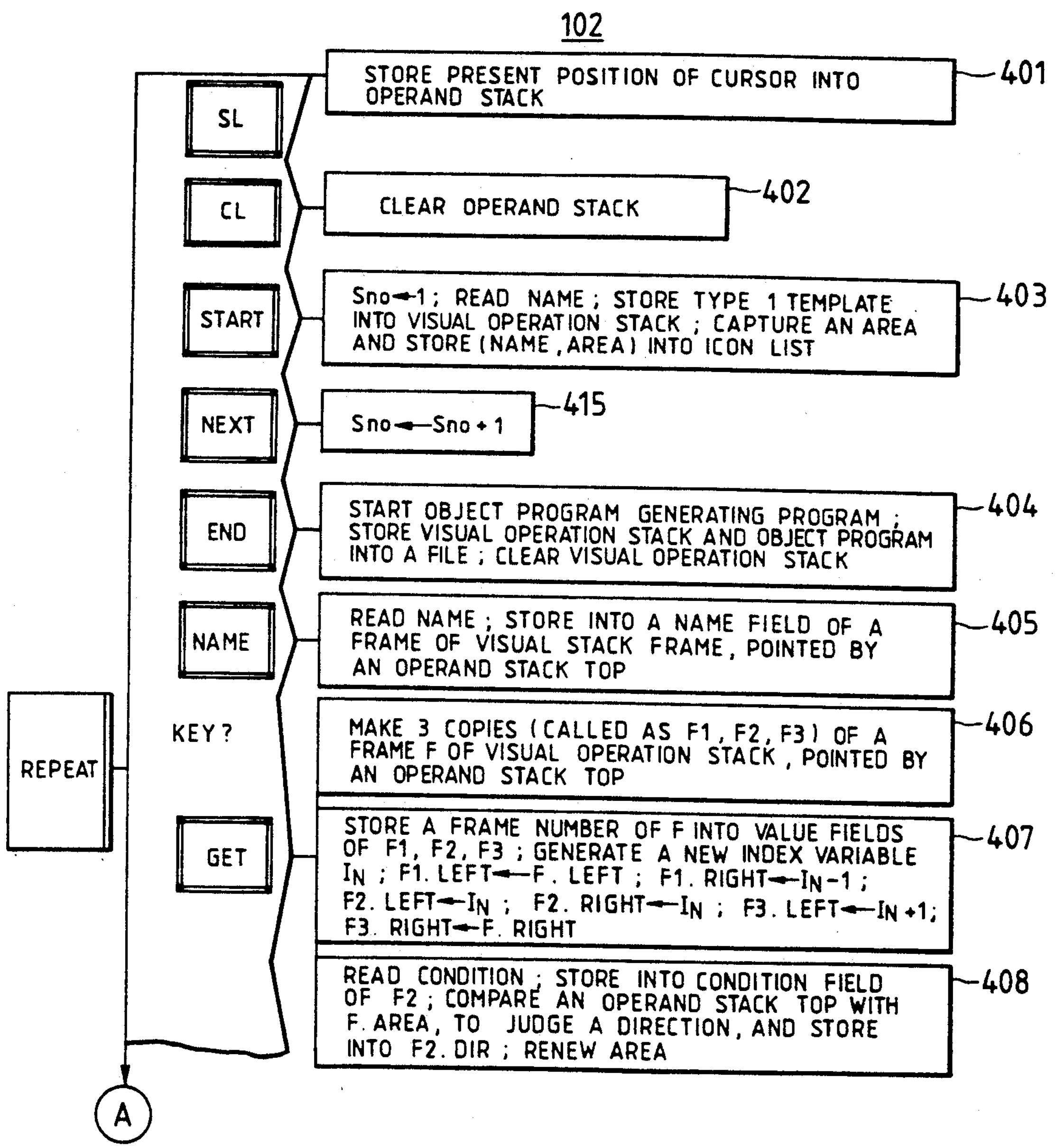
FIGS. 4A and 4B are respectively flow charts, in combination, of a data operation program (102) used in the apparatus shown in FIG. 1.
Figure 4B:
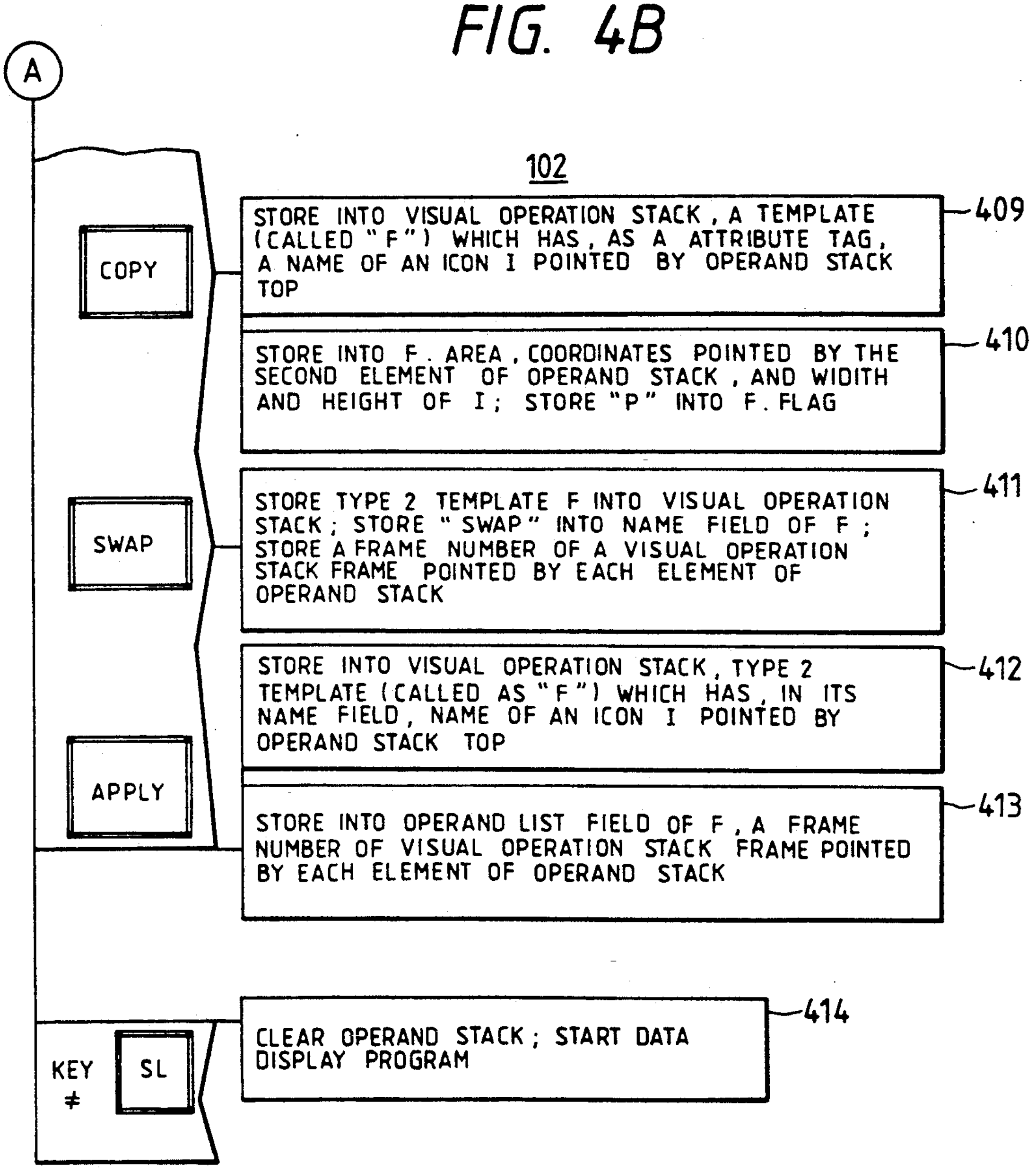
Figure 5:
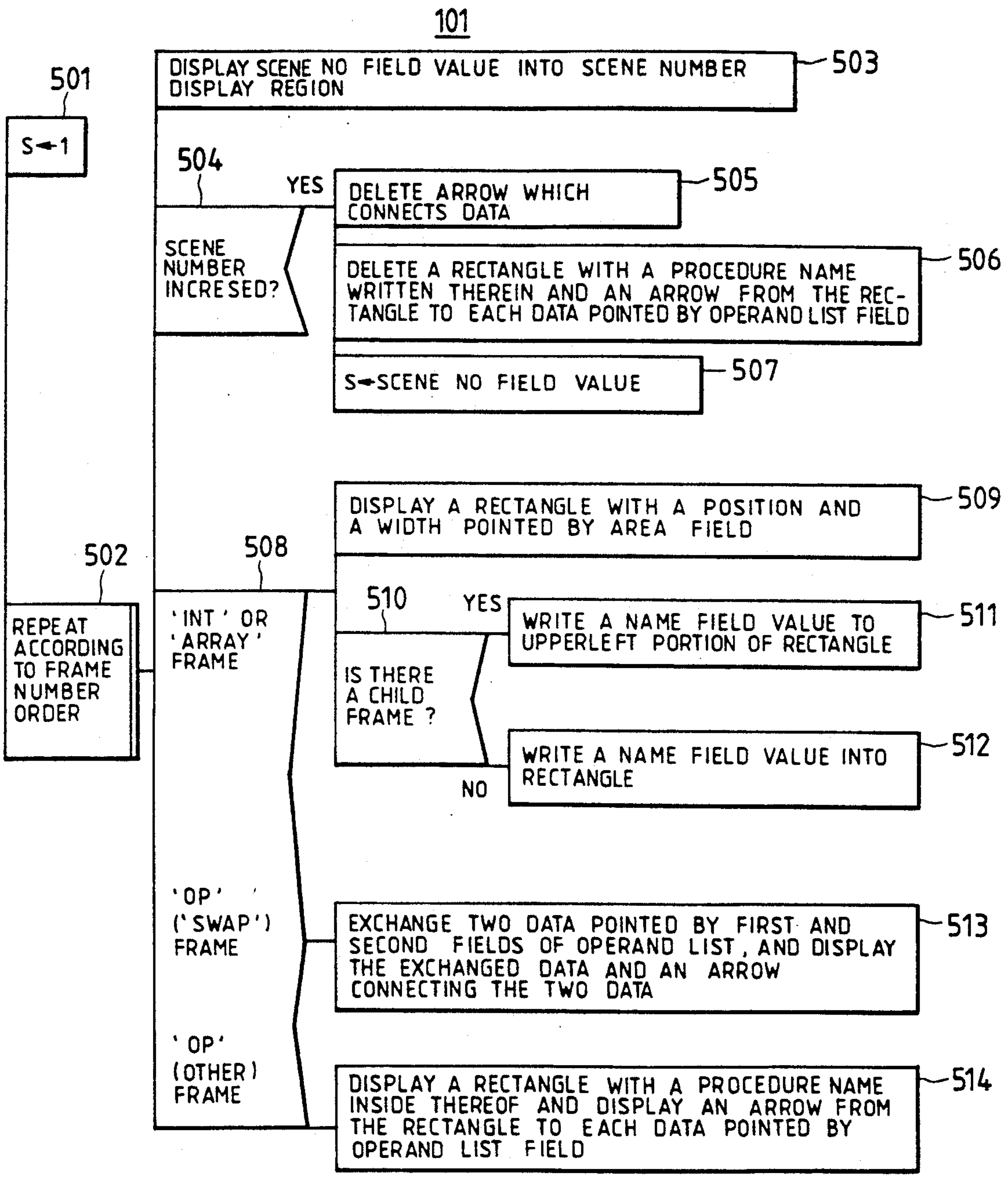
FIG. 5 is a flow chart of a data display program (101) used in the apparatus shown in FIG. 1.

When the programmer presses "Start" key 208 in the initial state, such a state is sent to the data operation program 102, and the process 403 in the flow chart of FIGS. 4A and 4B is started. First, 1 is set to variable Sno indicative of a scene number to demand the programmer an entry of a program name. "PART" as a program name is input by the programmer using a character key, then this is stored into a template 715 copying the template 304 of type 1 from the template data base 105 on the 0th fame of the visual operation stack 303 (which is empty in the initial state). The program name "PART" read and the value "1" of variable Sno are stored into the third field and the first field, respectively, of the template 715. In the initial state, they are displayed on the icon display area 202 and the icon area and icon name corresponding thereto are already stored into the icon list 302 (FIG. 1). When the "Start" key 208 is pressed, the icon area and the icon name with respect to the icon 714 having the program name "PART" as a name are added to the icon list 302 (Step 403, FIG. 4A).

In the divisional processing, it is necessary to operate the integer M which is the divided central value and the array data A divided, and therefore, the programmer needs to assign these. In the present embodiment, this designation is carried out by displaying rectangles and names thereof on the display area of data and operation. The following operation is carried out to display the divided central value on the display area 212. The cursor is moved by the operation of the mouse 109 onto the "Int" icon 710 which shows an integer displayed within the icon display area 202, and "SL" key 211 is pressed. In FIG. 7A, arrow 702 schematically indicates the icon selecting operation. The numeral of the arrow will be quoted as the numeral for process. The same will be applied to other arrows. Such a state is sent to the data operation program 102, and the cursor position at that time is stored into the operand stack 301 (FIG. 1) (Step 410, FIG. 4A). Then, the cursor is moved to a suitable position within the display area 212, and the "SL" key 211 is pressed to assign a position of a rectangle to be newly displayed (Step 703, FIG. 7A). After a new cursor position has been additionally stored into the operand stack 301, "Copy" key 206 is pressed. FIG. 7A shows schematically the pressing operation of the "Copy" key 704. The number attached to this key is used as the number of this operation. The same will be applied to other keys. When "Copy" key is depressed, an icon having a cursor position (a cursor position at the time of operation 702) stored in the first element of the operand stack 301 (FIG. 1) is searched from the icon list 302, which name is stored as a template 716 into the first frame of the visual operation stack 303 copying a template in the second field from the template data base 105 (Step 409, FIG. 4A). In this example, since the icon selected by the operation 702 is the "int" icon 710, the template 306 of type 3 is copied. The value of the variable Sno is stored into the first field 315 of the template 716, and the cursor position pointed by the second element of the operand stack 301 (cursor coordinate at the time of operation 703) and the size of the icon 710 are stored as the icon area 0 into the fourth field. Flag "P" indicative of an input parameter from the exterior is stored into the fifth field (Step 410, FIG. 4B). As will be described later, a frame 711 for icon is displayed at a position indicated at arrow 703 by the data display program 101 in response to the "Copy" key pressing operation 704.

The programmer names the icon by "Name" key 204. Therefore, in this case, when the programmer presses "Name" key 204 to input M as a name (Step 705, FIG. 7A), the data operation program stores the input name M into the third field of the template 716 just copied (Step 405, FIG. 4A). This name M is also displayed within the icon 711 by the data display program 101. In this manner, designation of data M is terminated.

Similarly, the icon 712 of the array data "A" is prepared by the selection operation 706 of the icon 713, the icon designation copying operation 708, and the naming operation 709, and the template 717 of type 4 corresponding to the array data A is added to the visual operation stack 303. "1" and "N" are stored as initial values into the eighth and ninth fields, respectively, of the template 717.

The data display program 101 is started every operation of one key (Step 414, FIG. 4B), and display the content of the visual operation stack 303 on the display 107. When the data display program 101 is started, the initial value 1 is set to the internal variable S indicative of the scene number as shown in the flow chart of FIG. 5 (Step 501, FIG. 5). The present initial setting is not carried out in the starts after the second time. Next, templates 303 in the visual operation stack are sequentially removed and processed in order of numbers (Step 502). In this case, since the second field of the template 716 in the first frame is "Int" type 3 template, a rectangle 711 of position and size indicated by the icon area 0 in the fourth field is displayed (Steps 508 and 509), and the data name M indicated by the third field is displayed (Step 512). The value "1" of the first field is displayed on the scene number display area 213. The template of the second frame also displays on the display 107 a rectangle 712 in accordance with the icon area 1 indicated by the fourth field, since the second field is "Array" (Type 4 template) (Step 509). In case of this template, judgement is made whether there are other frames in which said frame is pointed by the seventh field, that is, there is a child frame (Step 510). This judgement can be easily made by checking the seventh field when the respective frame is Type 4 template. In the case of this example, the seventh field remains "udf", and there is not present a child frame pointing the second frame, and therefore the data name A of the third field is displayed in the rectangle (Step 512).

In this manner, the image plane of the display in FIG. 7A is formed so as to correspond to the template shown in FIG. 7B.

Now, refer to FIGS. 8A and 8B, which show the procedure in which a programmer instructs to search an element X satisfied the condition $X \geqq M$ from the array data A in order of elements having a smaller element number in the array data. This instruction is accomplished first by moving a cursor to a left lower portion internally of icon 712 (FIG. 7A) of the array A by the operation 801, pressing selection "SL" key 211 to store a position of the cursor in the operand stack 301 (Step 401, FIG. 4A) and thereafter pressing "Get" key 203 which instructs the search.

When receiving the depression of the "Get" key, the data operation program 102 checks, on the basis of the cursor position at the time of operation 801 stored in the first element of the operand stack 301, an icon area value of the fourth field of Types 3 and 4 templates in order of smaller number and judge whether the area indicated by that value includes the cursor position at the time of operation 801. When templates including the cursor position (in this case, template 717) are found, three templates are copied and stored into the visual operation stack 303 (Step 406, FIG. 4A). In this case, the templates copied are templates 807 to 809 of the third to fifth frames of the visual operation stack 303. A value (equal to 1) of the variable Sno indicating the present scene number is stored into the first field for the templates 807 to 809. The copied ones and "2" which is a frame number of the template are stored into the seventh field for the templates 807 to 809, which thereby indicates that the templates 807 to 809 are partial data of data indicating a child template of the template 717 of the second frame, that is, the partial data of data indicating the template 717 of the second frame. A value 1 of the eighth field of the template 717 of the second frame is written into the eighth field of the template 807, and a value N of the ninth field of the second frame is written into the ninth field of the template 809. An index variable name "I0" generated by apparatus is stored into the eighth and ninth fields of the template 808 (thereafter, I1, I2, I3, . . . are generated as needed).

"I0-1" and "I0+1" are written into the ninth field of the template 807 and the eighth field of the template 809, respectively (Step 407, FIG. 4A). That is, the original array data A is divided into three partial arrays indicated by the templates 807 to 809. Next, when the data operation program 102 demands a programmer to make an input of a search condition formula and the condition formula 805 (X≧M) (FIG. 8A) is input, the condition formula is stored into the fifth field of the template 808. Then, the data operation program 102 check whether the cursor position indicated by the first element of the operand stack 3 is in a left half or a right half of the coin area 712 indicated by the fourth field of the template 717, and if it is in a left half, "L" is stored into, and if it is in a right half, "R" is stored into the tenth field of the template 808. In this case, "L" is stored. The icon area 810 indicated by the fourth field of the frame 807 is equal to that of the second frame, and the icon areas 811 and 812 indicated by the fourth field of the frames 808 and 809 are rectangles having the same height adjacent to each other in a horizontal direction. The width of rectanble 812 is the same as 810, and 811 is ½ of 810. The value indicating the width of the icon are indicated by the fourth field of the second frame which is a parent frame is renewed to the sum of values indicating the width in each fourth field of the templates 807, 808 and 809 (Step 408, FIG. 4A). That is, they are changed to those with respect a rectangle 712A including rectangles 810, 811 and 812 in FIG. 8A. In the above manner, processing of operation 803 of the "Get" key 203 is terminated.

A programmer then assigns a cursor to the area 811 by the operation 802 and then names "X" by the "Name" key operation 804. The data operation program 102 writes "X" to the third field of the template 808 corresponding thereto (Step 405, FIG. 4A). The operation of the data display program 101 with respect to the content of the visual operation stack 303 is similar to the case of FIG. 7A except that the name "A" is displayed at a left upper portion of a rectanble since the template 717 of the second frame has child templates 807, 808 and 809.

Next, the operation of apparatus corresponding to the operation of the programmer in FIGS, 9A and 9B will be described.

FIG. 9A shows the procedure in which a programmer instructs selection of an element Y satisfied with the condition Y<M in order of elements having the largest number of the array data A in a manner similar to that of selecting X in FIG. 8A. Specifically, when a cursor is moved to a right lower portion internally of the right-hand area 812 out of areas 810, 811 and 812 (FIG. 8A) obtained by dividing the array A into three portions, and selection "SL" key 211 of the mouse is pressed, after which the area 812 (FIG. 8A) is further subdivided into three rectangles 910, 911 and 912 by the "Get" key operation 903 which indicates a search, and the search condition formula Y M 905 is input to name "Y" to a central area 911 by a cursor operation 902 and "Name" key operation 904. Corresponding to these operations, the data operation program 102 adds templates 907, 908 and 909 (FIG. 9B) to the sixth to eighth frames of the visual operation stack 303. This adding operation is different from the case of FIG. 8B in that the index variable is "I1" instead of "I0", that since the cursor position at the time of the cursor operation 901 belongs to the right half of the area 812 (FIG. 8A) indicated by the fourth field of the template 809 of the fifth frame, "R" is stored into the tenth field of the template 908 and the icon area of the template 717 of the second frame is corrected to the area 712B including the areas 810, 811, 910, 911 and 912, and others are similar to those of FIG. 8B, which will not be further described.

The contents of the visual operation stack 303 shown in FIG. 9B were processed by the data display program 101, and as the result, the icon 711 for the integer M and the icon 712B for the array A which were divided into five areas 810, 811, 910, 911 and 912 are displayed on the display area 212 of the "data and operation" of the display 107. The detailed operation of the data display program 101 is similar to the case of FIGS. 8A and 8B, which will be therefore omitted.

Next, refer to FIGS. 10A and 10B. FIG. 10A shows the procedure in which a programmer instructs an exchange of array elements X and Y selected in the operation of FIGS. 8A and 9A. Specifically, a cursor is first moved into the area 811 (FIG. 9A) for the element X by the cursor operation 1001, "SL" key 211 is pressed to record a cursor position coordinate at that time into the operand stack 301, and the cursor is likewise moved into the area 911 (FIG. 9A) of the element Y by the cursor operation 1002 to record that position in the same stack. Thereafter, the programmer operates "Swap" key operation 1003 so that the data operation program 102 first copies the template 305 for the Type 2 data operation (FIG. 3) from the template data base 105 (FIG. 1) to store it as a template 1006 into the ninth frame of the visual operation stack 303. A constant value "SWAP" is stored into the third field of the template 1006. Nest, templates of Type 3 and Type 4 among templates in the visual operation stack 303 are checked in order of those having a smaller number to search a template in which a cursor position within the operand stack 301 in the fourth field is included within the template area thereof, and a list of frame numbers of the templates is stored into the fourth field of the frame 1006 (Step 411, FIG. 4B). In this case, the cursol position of the operation 1001 is within the occupied area 811 (FIG. 9A) of the element X represented by the template 808 of the fourth frame, and the cursor position of the operation 1002 is within the occupied area 911 (FIG. 9A) of the element Y represented by the template 908 of the seventh frame. Therefore, "4" and "7" are stored into the fourth field of the template 1006.

The data display program 101 sequentially removes templates within the visual operation stack 303 shown in FIG. 10B to provide a corresponding display on the display 107. The 0th to eighth frames are as already described but with respect t. the ninth frame, when the data display program 101 judges that the second field is "0p" and the third field is "SWAP" (Step 508, FIG. 5), rectangles 811, 911 and names X, Y with respect to the template 808 of the fourth frame and the template 908 of the second frame indicated by two frame numbers stored in the fourth field of the template 106 are exchanged and displayed, and an arrow 1004 connecting between two rectangles 811 and 911 (Step 513, FIG. 5).

Figure 11A:
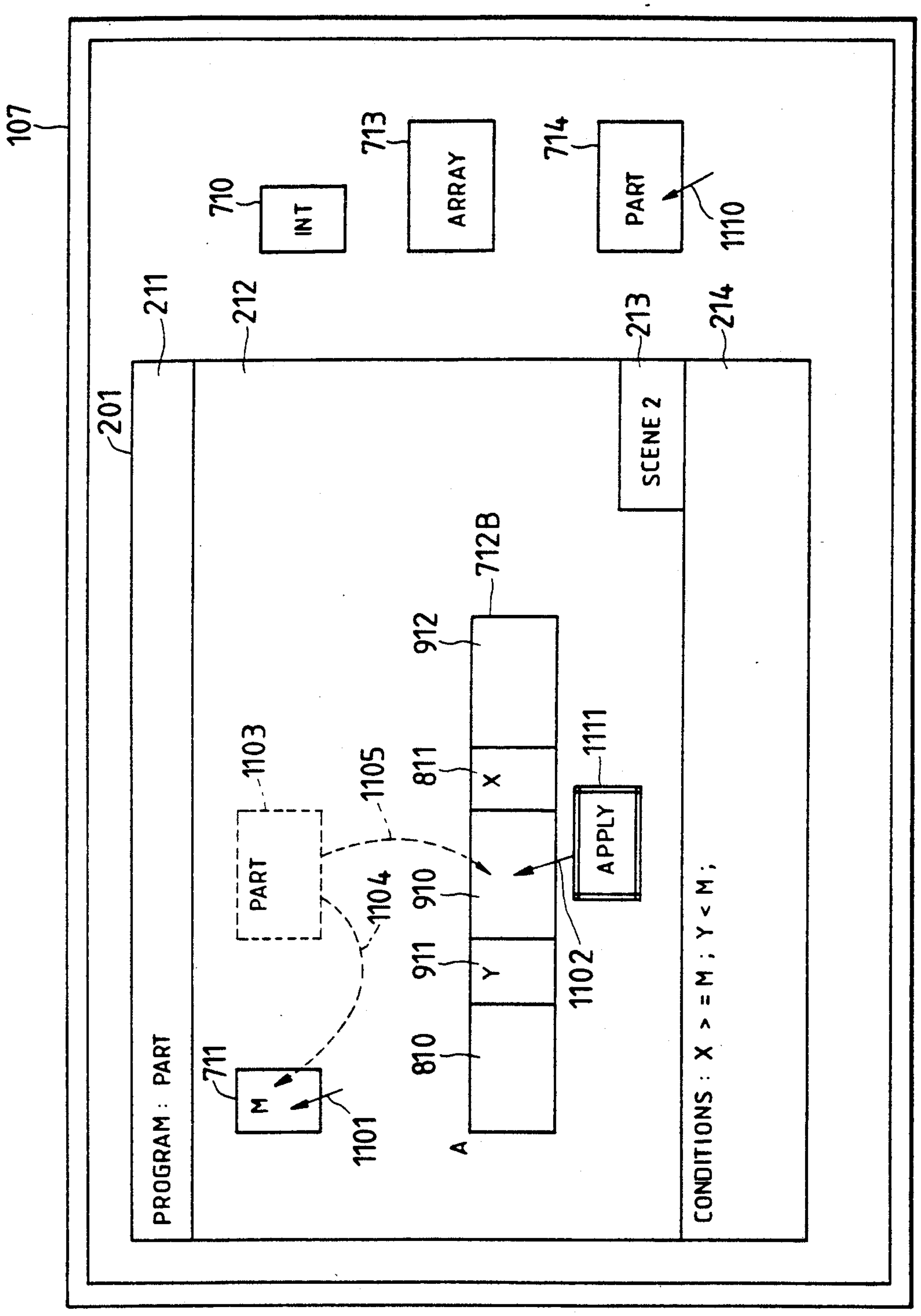
FIG. 11A illustrates the display image together with the previous operations when the fifth input step is completed in the apparatus shown in FIG. 1.

FIG. 11A shows the final operation of the program, which shows the procedure in which a program instructs that with respect to the integer data M 711 and the central portion 910 out of five partial areas 810, 911, 910, 811 and 912 within the area 712B for the array data A, the procedure of program "PART" so far designated is reflexively repeated. By this instruction, the array data A is divided into one smaller than the divided central value and the other larger than M, and therefore, the divisional process shown in FIG. 14 can be assigned. More specifically, a programmer first press "Next" key 209 (FIG. 2). When the data operation program 102 receives such depression, 1 is added to the value of the internal variable Sno indicating a scene number (Step 415, FIG. 4A). Next, the programmer moves a cursol selecting icon 714 of program name "PART", a cursor selecting icon 711 for integer M and a cursor selecting a central area 910 of array data A into the respective icons by the operation 1110, 1101 and 1102, respectively, and the cursor positions at that time are stored into the operand stack 301 by the "SL" key 211. The operation 1111 of pressing "Apply" key 207 is carried out. When the "Apply" key 207 is pressed, the data operation program 102 first copies the Type 2 template 305 (FIG. 3) from the template data base 105 to store it as template 1109 into the first frame of the visual operation stack 303. "2" as a scene number Sno is stored into the first field of the template 1109.

Next, the interior of the icon list 302 is checked with respect to the cursor position at the time of cursor operation 1110 for selecting icon for program name "PART" stored in to the first element of the operand stack 301 to search a name of an icon having a rectangle including that position. In this case, since the icon name "PART" is found, the constant value "PART" is stored into the third field of the icon 1109 of the tenth frame (Step 412, FIG. 4B). Similarly to the case of "Swap" key, frame numbers of templates for the visual operation stack 303 occupying a rectangle area including cursor positions stored in those after the second element of the operand stack are checked to store them into the fourth field of the operand 1109 of the tenth frame. In this case, the cursor position at the time of operation 1101 of the cursor for selecting icon for integer M is included in the area occupied by the template 716 of the first frame, and the cursor position at the time of operation 1102 of the cursor for selecting central portion 910 of the area for array data A is included in the area occupied by the template of the sixth frame with respect to the central portion 910. Accordingly, "1" and "6" are stored in the third field of the template 1109 of the tenth frame (Step 413, FIG. 4B).

The operation of the data display program 101 with respect to the content of the visual operation stack 303 shown in FIG. 11B is as already described in connection with the templates of the 0th to ninth frames. With respect to the template of the tenth frame, the data display program 101 judges that the second field thereof is "0p", and the third field is "PART" but not "SWAP" (Step 508, FIG. 5) to first display a rectangle 1103 in an empty area within the display area 212, display the value of the third field, i.e., "PART" therein and display arrows 1104, 1105 of rectangles 711, 1910 occupied by the templates of the frame numbers stored in the fourth field from the rectangles thereof (Step 514, FIG. 5). Since the first field of template 1109 of the tenth frame is "2", "2" is displayed in the scene number display area 213 of the display 107 (Step 503, FIG. 5). Further, since the internal variable S has been 1, judgement is made in which the scene number increased (Step 504, FIG. 5), and with respect to previous frames (0th to ninth frames), arrow 1004 (FIG. 10A) for the Type 2 template (in this example, 1006) or a rectangle display with a name (in this example, no rectangle is present) are all deleted (Steps 505 and 506, FIG. 5) and a sheet NO of the first of template 1109 of the tenth frame is stored into the internal variable S (Step 507, FIG. 5).

In the foregoing, the divisional process program PART has been defined, and therefore, "End" key 210 indicating the termination of the definition is pressed by a programmer. When receiving the "End" key, the data operation program 102 starts the object program generating program 104. When the operation of the object program generating program 104 is completed as will be described later, the visual operation stack 303 and the generated object program 106 are stored into the memory 106, after which the stack 303 within the data buffer area 103 is cleared (Step 404, FIG. 4A).

Figure 6A:
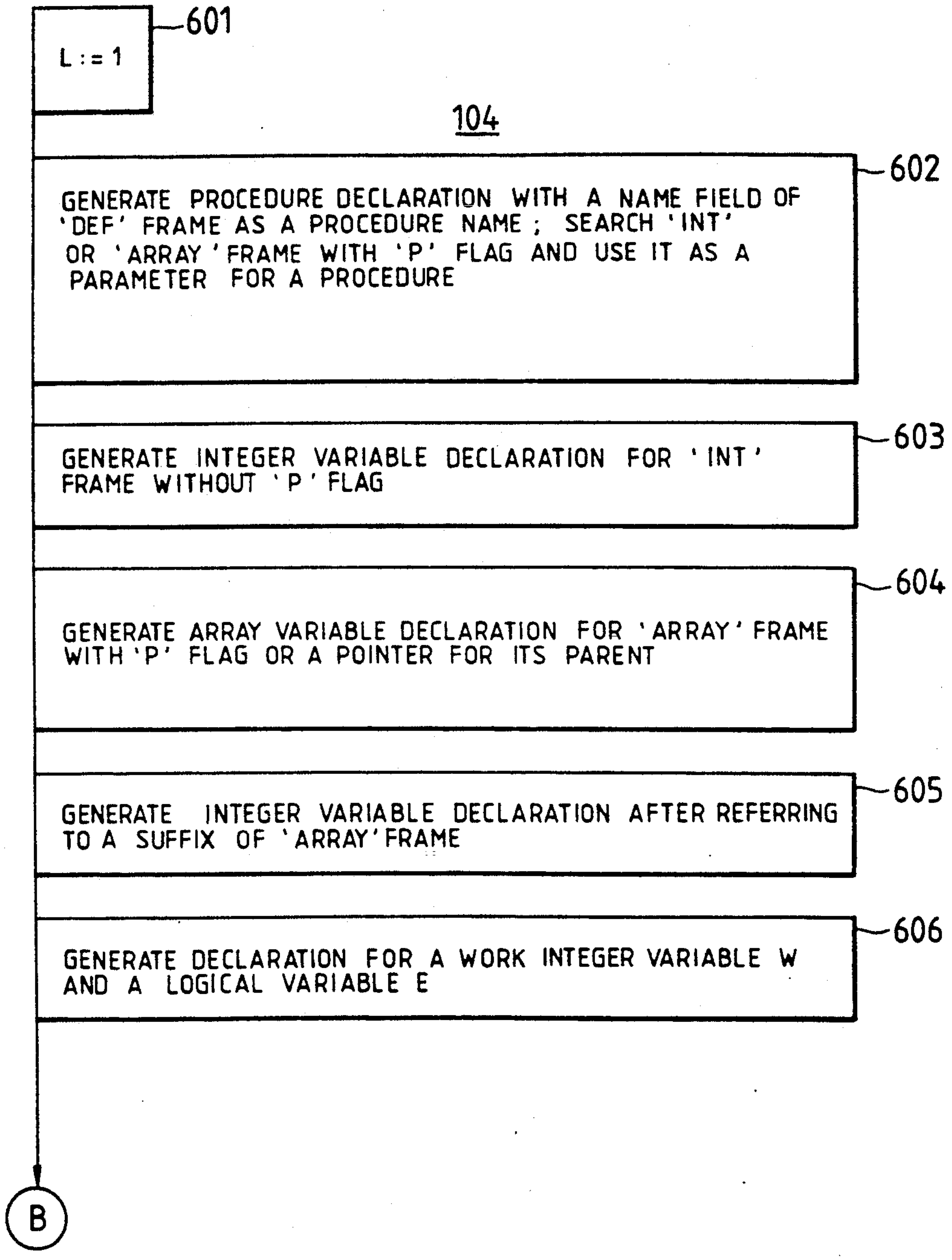
FIGS. 6A and 6B are respectively flow charts, in combination, of an object program generation program (104) used in the apparatus shown in FIG. 1.
Figure 6B:
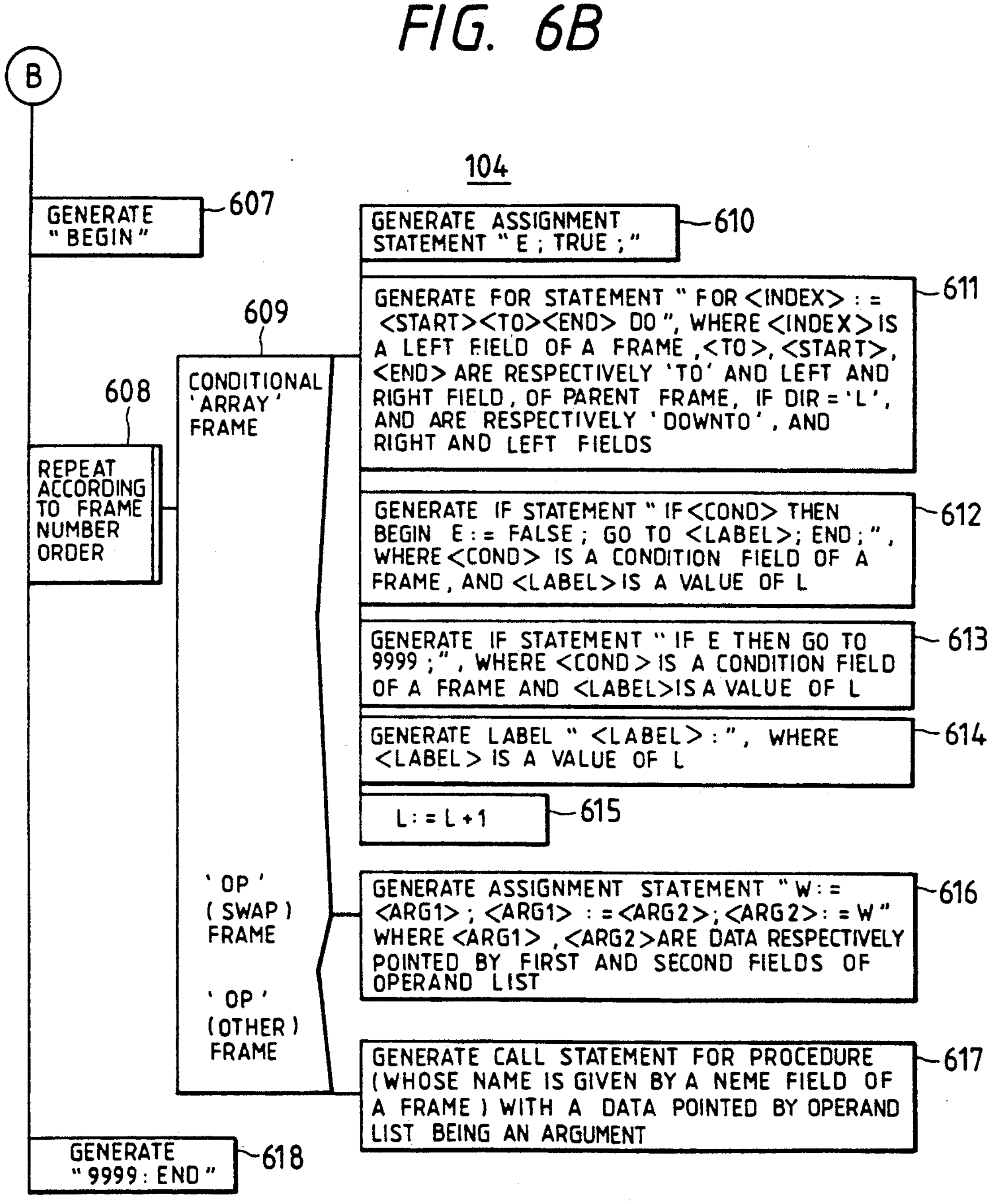

The operation of the object program generating program 104 will be described with reference to FIG. 6, taking a group of templates shown in FIG. 11B as an example. In the present embodiment, as shown in FIG. 12, an object program described in programming language PASCAL is generated.

When started, the object program generating program 104 initially sets 1 to an internal variable L (Step 601).

Next, a template whose second field is "Def", that is, the template 715 of the 0th frame is removed from the visual operation stack 303, and a procedure declaration sentence 1201 using the content "PART" of the third field as a procedure name is generated. A procedure parameter comprises data which are Type 3 template for integer data or Type 4 template for array data within the visual operation stack 303 and whose sixth field is represented by "P". In this case, the declaration sentence 1201 of the integer M represented by the templates 716 and 717 and the array data A is declared as a procedure parameter (Step 602).

Next, templates which are of Type 3 and whose sixth field is not "P" within the visual operation stack 303 are searched, and a declaration sentence therefor is generated (Step 603). In this case, there is no applicable template. Similarly, templates which are of Type 4 and whose sixth field is not "P" and in which a pointer to a parent template is not stored into the seventh field are searched, and a declaration sentence therefor is generated (Step 604). Also in this case, there is no applicable template.

Next, templates which are of Type 4 within the visual operation stack 30 are searched, and a variable declaration sentence with respect to an index variable appearing in the eighth and ninth fields is generated (Step 605). In this case, since index variables "I0" and "I1" appear in templates 807 to 809, and 907 to 909 of the third to eighth frames, a declaration sentence 1202 for I0 and I1 is generated. A declaration of a variable W for work and a logical variable E is added to the previous declaration sentence irrespective of the content of the stack 303 (Step 606).

Next, generation of a procedure body will be described. A keyword "begin" 1203 representative of the fact that description of the body started is generated (Step 607), and templates are removed in order from the first frame of the visual operation stack 303 to generate a sentence of a corresponding program (Step 608). Judgement is made whether the removed template is of the Type 4 template and one in which condition is described in the fifth field or is of the Type 2 template (Step 609). A sentence for frames other than those just mentioned is not generated.

Since the template 808 of the fourth frame is the Type 4 template having the condition formula in the fifth field, the object program generating program 104 first generates a substitution sentence "E:=true;" 1204 (Step 610). Next, "for" sentences (1205–1214) indicating a repetition are generated. That is, first, "for" sentence repeating indicating portion 1205 is generated. However, since the index variable is the eighth field I0 of the template 808 of the fourth frame and the lower limit and upper limit of the repetition are, since the tenth field is "L", the value 1 of the eighth field of the template 717 of the second frame which is the parent template of this template and the value N of the ninth field (Step 611). Then the body 1206 of the "for" sentence is generated. The body 1206 comprises an "if" sentence which effects judgement of conditions. The judging condition is one obtained by replacing the variable name X of the fifth field of the template 608 of the fourth frame referring to the name A of the template 717 which is the parent template and the suffix name I0 of the eighth field, that is, "A(I0)>=M". The "then" portion of the "If" sentence 1206 comprises a substitution sentence of a constant value "false" to a logical variable E and a "goto" sentence of a label. However, the label is the value of the internal variable L of the object program generating program 104 (Step 612). An "if" sentence 1207 for judgement of termination is generated followed by the "for" sentence (Step 613). By the "if" sentence 1207, if there is not present an element of array A satisfied with the condition in the previous "for" sentence, the program is terminated. Further, a label 1: (1215) having the value of the internal variable L is generated to complete generation of a sentence with respect to the Type 4 template with conditions.

The object program generating program 104 processes, since the template 908 of the seventh frame is next Type 4 template with the condition, similar to the template 808 of the fourth frame to generate sentences 1208, 1209, 1210 and 1211 and label 1216. This operation is almost similar to the process of the template of the fourth frame and will not be described. However, since the tenth field of the template 908 of the seventh frame is "R", in the "for" sentence repetition indicating portion 1209, the upper limit value and lower limit value are respectively the value N of the ninth field of the template 809 of the fifth frame which is the parent template and the value I0 of the eighth field (Step 611). That is, note that this is reversed to the case of the template 808 of the fourth frame.

The object program generating program 104 removes a template 1006 of the ninth frame which is the Type 2 template to generate a corresponding sentence. That is, since the third field is "SWAP", it generates three substitution sentences indicative of an exchange using a variable W for work. Data exchanged indicates the fourth field of the template 1006 of the ninth frame, and in this case, data represented by the template 808 of the fourth frame and the template 908 of the seventh frame are X (equal to A(I0)) and Y (equal to A(I1), and therefore, three substitution sentences 1212 for exchanging these are generated (Step 616).

Finally, the object program generating program 104 removes the template 1109 of the tenth frame which is the Type 2 template to generate a corresponding sentence. That is, since the third field is "PART", a sentence 1213 for calling the procedure PART is generated. A parameter of the procedure call comprises data represented by a frame pointed by a frame number stored in the fourth field of the template 1109 of the tenth frame. In this case, frames pointed by the fourth field are the first and sixth frames, and data represented by the templates 716 and 907 with these frames comprise an integer M and a partial array A (I0+1 . . . I1−1), which are therefore used as parameters (Step 616).

In the foregoing, since all frames of the visual operation stack 303 have been processed, a sentence 1214 indicative of termination is generated (Step 618), and the operation of the object program generating program 104 is completed.

Figure 13:
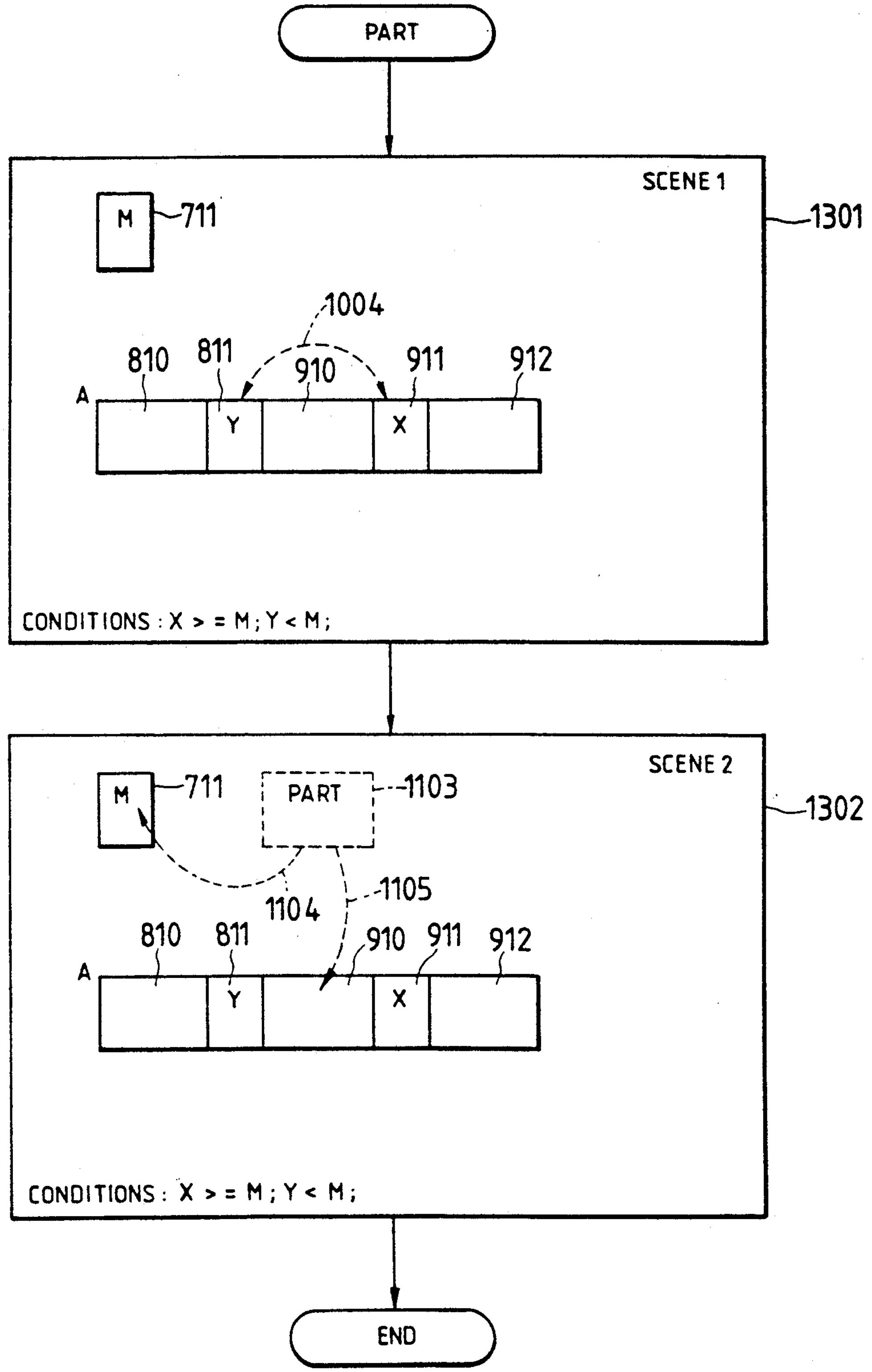
FIG. 13 illustrates another example of use of a group of templates generated in the apparatus of FIG. 1.

After generation of the object program, the data operation program 102 stores a group of final templates within the visual operation stack 303 shown in FIG. 11B in the memory 106 as mentioned above. There are advantages as follows: A flow chart as shown in FIG. 13 is obtained which depicts the operation contents of the program connecting data for each scene number and display of operation using the contents of the stack. It is apparent that FIG. 13 is obtained from the visual operation stack 303 by the mechanism almost similar to the data display 101. By obtaining FIG. 13, in preparation of complicated programs requiring many operations, the procedure thereof and changes in data are visualized.

While in the present embodiment, pre-prepared templates are limited to integer, array or the like for brievity's sake, it is to be noted of course that various data constructions such as list, wood, record and the like can be also easily employed. Furthermore, while in the present embodiment, the operation principally comprises an exchange and a transfer, it is to be noted that other operations such as deletion, insertion and the like are easily included. By these extensions, the efficiency in preparation of programs and the range of application are further enhanced.

As described above, according to the present invention, a programmer can prepare a program while always two-dimensionally visualizing data and operation therefor, and therefore the preparation of program is efficiently attained. For example, even in the case of the divisional processing program, data construction and changes thereof are quite obvious in the present invention by comparison between a flow chart which is a conventional method of visualizing a program shown in FIG. 14 and the result of program preparation (FIG. 13) by apparatus according to one embodiment of the present invention. Moreover, one need not be conscious of suffixes of array, boundary conditions and the like, and control constructions such as judgement of conditions, repetition and like are automatically generated and therefore programs are easily prepared.

What is claimed is:

1. A program generation method of generating a program for processing an array by a processing device in response to various commands inputted by an operator through keys of a keyboard and selection thereby of icons displayed on a screen of a display device, comprising the steps, executed by said processing device, of:

(a) in response to input of each of a plurality of commands each designating one of plural data to be processed by the program, storing a first kind of data indicative of said designated one of the plural data, and displaying a first kind of icon indicative of said designated one of the plural data, wherein at least one particular data within said plural data comprises array data of said array, said array data comprises a set of data elements each of which is designated by a name of the array data and a value of an index assigned to said each data element, the index being common to the set of data elements;

(b) in response to input of at least one particular command which requires selection of a data element which satisfies a data selection condition designated by the particular command, within said array data, storing a second kind of data indicative of a first part of the array data which comprises one data element which satisfies the data selection condition, within said array data, storing a third kind of data indicative of a second part of this array data which comprises one or plural data elements which do not satisfy the data selection condition, within said array data, and storing a fourth kind of data indicative of the data selection condition and displaying a second icon indicative of the first part of the array data and a third icon indicative of the second part of the array data;

(c) in response to input of each of said commands each designating an operation to be executed and selection of at least one of said second and third icons displayed on said display device, storing a fifth kind of data indicative of execution of the operation on one data corresponding to the selected one icon, and storing a sixth kind of data indicative of a resulting data of the operation, and displaying a fourth icon indicative of the resulting data; and (d) in response to input of a command requiring generation of a program for processing said array, storing a program which executes a sequence of processings on said array required by commands inputted on the plural data to be processed, based upon data already stored in the steps (a) to (c).

2. A program generation method according to claim 1, wherein said step (a) further includes the step of:

storing, in response to each of a plurality of commands each requiring generation of data, a data kind of data designated by each command.

3. A program generation method according to claim 2, wherein the program generation step (d) includes the step of generating, in response to a data kind already stored for data designated by one of the commands requiring generation of data, an object code which declares a data variable which is of a same data kind as the already stored data kind for said designated data.

4. A program generation method according to claim 1, wherein the program generation step (d) includes the step of generating, in response to the already stored fourth kind of data indicative of the data selection condition, an object code which branches to different processing, depending upon whether or not there is a data element within the array data, which satisfies the data selection condition.

5. A program generation method according to claim 1, wherein the program generation step (d) includes the step of generating, in response to the already stored fifth kind of data indicative of an execution of an operation, an object code which calls a procedure which executes the operation.

6. A program generation method of generating a program for processing an array in a system including a display device, an input device for inputting commands and a processor for processing inputted commands, said input device including a position selector for selecting one of icons displayed by the display device, said method comprising the steps, executed by the processor, of:

(a) displaying an icon representative of array data of said array, said array data comprises a set of data elements each of which is designated by a name of said array and a value of an index, assigned to said each data element, the index being common to the set of data elements;

(b) in response to a preceding command inputted by an operator and in response to selection of the displayed icon by said operator, displaying a preceding group of icons each representative of one preceding group within preceding groups of data elements, when data elements of the array data are divided into the preceding groups as a result of execution of preceding processing required by the preceding command on the array data;

(c) in response to at least one succeeding command inputted by the operator and in response to selection of at least one of the preceding group of icons representative of one group within the preceding groups of data elements, displaying a succeeding group of icons each representative of a group within succeeding groups of data elements, when the data elements of the one preceding group represented by the selected one icon are further divided into the succeeding groups as a result of execution of processing required by the succeeding command on the preceding one group of data elements represented by the selected one icon; and (d) in response to a program generation command inputted by the operator, generating a program which executes a sequence of processings on said array required by a sequence of commands inputted by the operator, including the preceding and succeeding commands.

7. A method according to claim 6, wherein:

displaying as the succeeding group of icons a group of icons which is representative of a group within plural groups of data elements when the plural groups of data elements are obtained after execution of the processing required by the succeeding command on the one preceding group of data elements.

8. A program generation method of generating a program for processing structured data in a system including a display device, an input device for inputting commands and a processor for processing inputted commands, said input device including a position selector for selecting one of icons displayed by the display device, said method comprising the steps, executed by the processor, of:

(a) displaying a first group of icons each representative of one of first different portions of array data of said structured data, said array data comprises a set of data elements each of which is designated by a name of said structured data and a data identifier which is uniquely assigned to send a data element among the set of data elements;

(b) in response to a command inputted by an operator and in response to selection of at least one icon of the first group by said operator displaying a second group of icons each representative of one of second different portions of said array data, when the data elements of the array data are further divided into the second different portions, as a result of execution of processing required by the command on one first portion within the original array data, represented by the selected one icon;

(c) repeating the step (b), by using the second group of icons in place of the first group of icons; and (d) in response to a program generation command inputted by the operator, generating a program which executes a sequence of processings on said structured data required by a sequence of commands inputted by the operator.

9. A program generation method of generating a program for processing an array of data by a processing device in response to various commands inputted by an operator and selection thereby of icons displayed on a screen of a display device, comprising the steps, executed by said processing device, of:

(a) responsive to input of each of a plurality of commands of a first kind each designating one of plural data to be processed by the program, displaying on said display device an icon indicative of the designated one data;

(b) in response to input of another particular command which designated a data selection condition and in response to selection of one or plural data elements within array data of said array that satisfy the data selection condition, displaying an icon indicative of one or plural data elements within said array data which satisfy the data selection condition and an icon indicative of one or plural data elements within said array data which do not satisfy the data selection condition;

(c) responsive to input of each of commands each designating an operation to be executed and to selection for that each command, of at least one of the icons displayed on said display device, displaying on said display device an icon indicative of resulting data of the operation on one data corresponding to the selected icon;

(d) in response to input of one particular command which designates one array data as one of the plural data to be processed, displaying an icon indicative of said array data which comprises a set of data elements each of which is designated by a name of said array and a value of an index, assigned to send each data element, the index being common to the set of data elements;

(e) in response to input of another particular command which designates a data selection condition and which requires selection of one or plural data elements within said array data, which satisfy the data selection condition, displaying an icon indicative of one data element within said array data which satisfies the data selection condition and an icon indicative of one or plural data elements within said array data which do not satisfy the data selection condition; and (f) responsive to input of a command of a third kind requiring generation of a program for processing said array, storing a program which executes a sequence of processings on said array required by commands inputted by said operator.

10. A program generation method of generating a program for processing an array in a system including a display device, an input device for inputting commands and a processor for processing inputted commands, said input device including a position selector for selecting one of icons displayed by the display device, said method comprising steps, executed by the processor, of:

(a) displaying an icon representative of array data of said array, said array data comprises a set of data elements each of which is designated by a name of said array and a value of an index, assigned to said each data element, the index being common to the set of data elements;

(b) in response to a preceding command inputted by an operator and in response to selection of the displayed icon by said operator, displaying a preceding group of icons each representative of one preceding group within preceding groups of data elements, when the set of data elements are divided into the preceding groups as a result of execution of the preceding command on the array data;

(c) in response to at least one succeeding command inputted by the operator and in response to selection of at least one of the preceding group of icons representative of one preceding group of data elements within the preceding groups of data elements, displaying another icon indicative of a result of execution of the succeeding command on the one preceding group of data elements; and (d) in response to a further succeeding command which requires generation of a program for processing said array, generating a program which executes a sequence of processings on said array required by a sequence of commands inputted by the operator, including the preceding command and the succeeding command.

11. A method according to claim 10, wherein the preceding command is a data selection command which requires selection of one of the set of data elements which satisfies a data selection condition designated by the data selection command; and wherein the preceding groups of data elements comprises a first group which includes one data element which satisfies the data selection condition, a second group which comprises data elements which do not satisfy the data selection condition and which have smaller values of the index assigned than a value of index assigned to the one data element, and a third group which have larger values of the index assigned than the value of the index assigned to the one data element.

12. A method according to claim 11, wherein the selected one preceding group of data elements are the third group of data elements;

wherein the succeeding command is another data selection command which requests selection of another data element within the third group of data elements, which satisfies another data selection condition designated by the another data selection command;

wherein the another icon is representative of the another data element within the third group of data elements;

wherein the method further includes the step of displaying, in response to the another data selection command, further another icon and still further another icon, the further another icon representing a group of data elements among the third group of data elements, which have larger values of the index assigned than a value of index assigned to the another data element and which do not satisfy the another data selection condition, and the still further another icon representing a group of data elements within the third group of data elements, which have smaller values of the index assigned than the value of index assigned to the another data element.

* * * * *